(12) United States Patent
Sakushima et al.

(10) Patent No.: US 7,103,777 B2
(45) Date of Patent: Sep. 5, 2006

(54) USER INFORMATION CONTROL DEVICE

(75) Inventors: Hiromi Sakushima, Kawasaki (JP); Sachiko Uranaka, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 438 days.

(21) Appl. No.: 10/069,931

(22) PCT Filed: Jun. 29, 2001

(86) PCT No.: PCT/JP01/05655

§ 371 (c)(1),
(2), (4) Date: Mar. 5, 2003

(87) PCT Pub. No.: WO02/03215

PCT Pub. Date: Jan. 10, 2002

(65) Prior Publication Data
US 2004/0128557 A1 Jul. 1, 2004

(30) Foreign Application Priority Data
Jun. 30, 2000 (JP) .............................. 2000-200210

(51) Int. Cl.
*G06F 11/30* (2006.01)
(52) U.S. Cl. .................... 713/182; 713/161; 713/168
(58) Field of Classification Search ............... 713/182, 713/161, 168, 200, 201
See application file for complete search history.

(56) References Cited

U.S. PATENT DOCUMENTS 5,574,786 A * 11/1996 Dayan et al. ................. 726/36
6,167,521 A * 12/2000 Smith et al. ................. 726/21
6,298,445 B1 * 10/2001 Shostack et al. ............. 726/25

* cited by examiner

Primary Examiner—Thomas R. Peeso
(74) Attorney, Agent, or Firm—Pitney Hardin LLP

(57) ABSTRACT

Provided are: a user information management apparatus and method capable of efficiently preventing user information from being utilized by another person in family or being distributed to the outside, thereby protecting security; a recording medium having recorded therein a control program for managing user information; and, in order to provide a user information management program, transmission disabling means 44-1 and 44-2 for, after elapse of a predetermined period of time and/or after execution of a predetermined operation after predetermined user information is enabled to be transmitted by transmission control means, or alternatively, according to a predetermined instruction from the user, disabling transmission of user information thus enabled to be transmitted. In addition, personal information or the like desired to be managed with the rank or level can be classified by a predetermined level or the like to be managed, thereby making it possible to provide more detailed information management.

57 Claims, 35 Drawing Sheets

Data scope when mother has provided access at level 2

FIG. 7

Data attribute definition

```
<User accessLevel = "2">
    <Name jp-description = "Name">
        <First type = "text" jp-description = "First" probability = "0.00001"/>
        <Last type = "text" jp-description = "Last" probability = "0.00001"/>
    </Name>
    <Bdate jp-description = "Date of birth" probability = "0.00274">
        <Ymd>
            <Year type = "number" jp-description = "Year"/>
            <Month type = "number" jp-description = "Month"/>
            <Day type = "number" jp-description = "Day"/>
        </Ymd>
    </Bdate>
    <Gender type = "gender" jp-description = "Gender" probability = "0.5"/>
</User>
<Dynamic accessLevel = "3">
    <ClickStream/>
        <Client type = "text"/>
        <Server type = "text"/>
    </ClickStream>
</Dynamic>
```

FIG. 8

Person based data

```
<User>
    <Name>
        <First value = "Tanaka"/>
        <Last value = "Kazuko"/>
    </Name>
    <Gender accessLevel = "1" value = "Female"/>
</User>
<Dynamic>
    <ClickStream/>
        <Client type = "htttp://www.foo.com/bar1.html"/>
        <Client type = "htttp://www.foo.com/bar2.html"/>
    </ClickStream>
</Dynamic>
```

FIG. 9

Data of which instance of level 1 is generated

```
<User>
     <Gender accessLevel = "1" value = "Female"/>
</User>
```

FIG. 10

Data of which instance of level 2 is generated

```
<User accessLevel = "2">
    <Name>
        <First value = "Tanaka"/>
        <Last value = "Kazuko"/>
    </Name>
</User>
```

FIG. 11

Data of which instance of level 3 is generated

```
<Dynamic accessLevel = "3">
    <ClickStream/>
        <Client type = "htttp://www.foo.com/bar1.html"/>
        <Client type = "htttp://www.foo.com/bar2.html"/>
    </ClickStream>
</Dynamic>
```

FIG. 12

Level 1

| User ID | Data description | Value |
|---|---|---|
| 0000001 | User.Gender | Female |

Level 2

| User ID | Data description | Value |
|---|---|---|
| 0000001 | User.Name.First | Tanaka |
| 0000001 | User.Name.Last | Hanako |
| 0000002 | User.Name.First | Watanabe |
| 0000002 | User.Name.Last | Taro |
| 0000002 | User.Gender | Male |

Level 3

| User ID | Data description | Value |
|---|---|---|
| 0000001 | Dynamic.ClickStream.Client | htttp://www.foo.com/bar1.html |
| 0000001 | Dynamic.ClickStream.Client | htttp://www.foo.com/bar2.html |
| 0000002 | Dynamic.ClickStream.Client | htttp://www.aaa.co.jp/bbb/ccc.html |

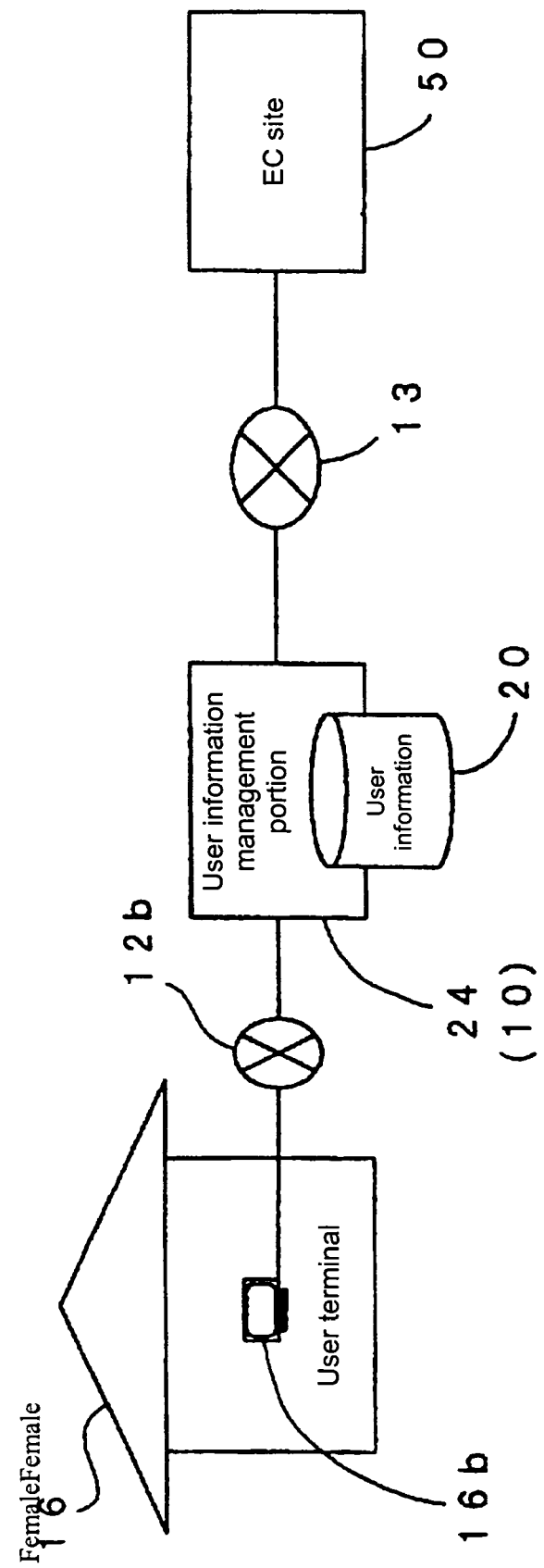

FIG. 15

IC card authentication is ready.

Enter your card.

These codes are described.

<INPUT TYPE = "text" NAME = "User.Name">
<INPUT TYPE = "text" NAME = "User.Postal.Postalcode">
<INPUT TYPE = "text" NAME = "User.Postal.Formatted">
<INPUT TYPE = "text" NAME = "User.Telecome.Telephone">

FIG. 17

<INPUT TYPE = "text" NAME = "User.Name" value = "Taro Yamada">
<INPUT TYPE = "text" NAME = "User.Postal.Postalcode" value = "123-0000">
<INPUT TYPE = "text" NAME = "User.Postal.Formatted" value = "Tokyo...">
<INPUT TYPE = "text" NAME = "User.Telecome.Telephone" value = "03-1234-5678">

Value is corrected.

Enter delivery destination information.

Name: Taro Yamada
Postal code: 123-0000
Address: Tokyo...
Telephone: 03-1234-5678

OK    Back

FIG. 20

| Data description | Required access level |
|---|---|
| Data A | 1 |
| Data B | 2 |
| Data C | 3 |
| ⋮ | ⋮ |

FIG. 22

Data A

"Yearly income: 12,800,000 Yen"

Access level: 3

Data B

"Address: Sumida-ku"

Access level: 1

Data C

"Name: Taro Matsushita"

Access level: 2

FIG. 23

Data A

| | |
|---|---|
| Owner: | X |
| Title: | Credit card number |
| Content: | 1234-5678-9012-3456 |

Data B

| | |
|---|---|
| Owner: | Y |
| Title: | Bank deposit number |
| Content: | QR0332163770 |

Data C

| | |
|---|---|
| Owner: | Z |
| Title: | Student ID number |
| Content: | 040167B |

| Access privilege | Data title | Data owner |
|---|---|---|
| Z | Credit number | X |
| Z | Bank deposit number | Y |
| ⋮ | ⋮ | ⋮ |

USER INFORMATION CONTROL DEVICE

This application is a national stage application of International application no. PCT/JP01/05655, filed Jun. 29, 2001, which in turn claims priority of Japanese patent application no. 2000-200210, filed Jun. 30, 2000.

1. Technical Field

The present invention relates to security protection of user information. More particularly, the present invention relates to: a user information management apparatus for security protection of information on a user held in a user terminal having a bidirectional communication function and/or a server connected thereto; a user information management method; a recording medium having recorded therein a control program for executing the user information management method; and a user information management program.

2. Background Art

In conventional bidirectional communication, a personal computer (PC) is primarily used as a user terminal. For security of information in such a personal computer environment, it is assumed that one terminal is used by only one user, and security management using log-in/log-out is basic under such an assumption. However, at a digital television terminal, it is assumed a mode in which a plurality of persons in a family watch one television at the same time or dispatch information, or alternatively, another user uses the information without carrying out clear login/logout or the like.

That is, when a person in a family enjoys online shopping via a server by using a digital television terminal, there continues a state in which personal information such as credit card number or validity required for purchasing a commodity or user terminal information is held at the user terminal or server. In this state, if a person having purchased a commodity is distant from the digital television terminal, it is predicted that another person in the family further purchases another commodity by using information such as a first purchaser's credit card irrespective of the first purchaser's intention. In addition, if there continues a state in which personal information or user terminal information is held at the user terminal or server as well as illegal use of personal information by a person in family, there is a danger that such information is accidentally delivered to the outside. Personal information includes important information associated with properties or money such as credit card number or highly confidential information to be managed with ranks or levels such as name or gender which should be kept secret from other persons. Publicly known security techniques include: specifying what action (reading or writing) can be executed by an application or class or what resource (file) is targeted for such an action, as in by security using Java2 (http://java.sun.com/); and determining whether or not access is made by comparing one of individual access policies (preferences) and one of site policies in response to access to a Web site, as in P3P (see http://www.w3.org/P3P/).

However, even if these techniques are used to protect security of the above personal information at terminals that a plurality of users use, there has been a problem that sufficient advantageous effects cannot be attained. Further, in a technique disclosed in Japanese Patent Application Laid-open No. 2000-112796, database access is controlled in accordance with privacy parameters stored in a database table. In this technique, it is required to include a supervisory module in order to efficiently apply privacy parameters, and there are provided a plurality of forced data views through which all data pass.

Therefore, it is an object of the present invention to provide a user information management apparatus and method capable of efficiently prevent user information from being used by another person in family or being delivered to the outside, thereby protecting security; and a recording medium having recorded therein a control program for user information management. In addition, according to one of the preferred embodiments of the present invention, personal information or the like which should be managed with the ranks or levels can be managed by being classified by predetermined levels or the like.

In addition, in the conventional security management using login/logout, when an attempt is made of providing access to one item of data, if an error occurs due to the absence of access privilege for such data, login must be carried out for a user having access privilege in order to obtain such access privilege. In this case, after carrying out login, it is required to make access to the same data by performing the same operation again. This made it impossible to change only access privilege smoothly while efficiently using the past operation.

Therefore, it is one of the preferred embodiments of the present invention that, after access to data is accepted, even if an error occur due to the absence of access privilege, the access privilege to data on the accepted access is changed, thereby making it possible to continue operation.

SUMMARY OF THE INVENTION

The present invention has been made in order to achieve the foregoing object. In the present invention, there is provided transmission disabling means for, after elapse of a predetermined period of time and/or after execution of a predetermined operation after predetermined user information is enabled to be transmitted by transmission control means, or alternatively, according to a predetermined instruction from the user, disabling transmission of user information thus enabled to be transmitted. In addition, personal information or the like which should be managed with the ranks or levels can be managed by being classified by a predetermined level, thereby making it possible to provide more detailed information management.

That is, according to the present invention, there is provided a user information management apparatus constructed over a server capable of making bidirectional communication with a user terminal, or alternatively, at the user terminal, the apparatus comprising:

storage means for holding user information concerning a plurality of users who use the user terminal to be associated with a security level;

identification means for, when a user makess access to the server and an attempt is made by the user to use a predetermined application, identifying the user;

level determination means for, when the user makes access to the server, determining at which of a plurality of predetermined certification levels this access is;

transmission control means for enabling transmission of only the user information at the security level and the lower security level than said security level that corresponds to the determined level to the user terminal and/or another device among the user information held in the storage means; and transmission disabling means for, after elapse of a predetermined period of time and/or after execution of a predetermined operation after predetermined user information is enabled to be transmitted by transmission control means, or alternatively, according to a predetermined instruction from the user, disabling transmission of user information thus enabled to be transmitted.

In addition, according to the present invention, there is provided a user information management method in the user information management apparatus constructed over a server capable of making bidirectional communication with a user terminal, or alternatively, at the user terminal, the method comprising the steps of:

storage step of holding user information concerning a plurality of users who use the user terminal to be associated with a security level;

identification step of, when a user makes access to the server and an attempt is made by the user to use a predetermined application, identifying the user;

level determination step of, when the user makes access to the server, determining at which of a plurality of predetermined certification levels this access is;

transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted.

In addition, according to the present invention, there is provided a recording medium having recorded therein in a computer readable state a control program for executing the user information management method in the user information management apparatus constructed over a server capable of making bidirectional communication with a user, or alternatively, at the user terminal, the recording medium having recorded therein in a computer readable state a control program for executing the user information management method comprising the steps of:

storage step of holding user information concerning a plurality of users who use the user terminal to be associated with a security level;

identification step of, when a user makes access to the server and an attempt is made by the user to use a predetermined application, identifying the user;

level determination step of, when the user makes access to the server, determining at which of a plurality of predetermined certification levels this access is;

transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted.

It is one of the preferred embodiments of the present invention that only user information at a security level or lower than the security level that corresponds to the determined level is enabled to be transmitted to the user terminal and/or another device.

In addition, it is one of the preferred embodiments of the present invention to use a password inputted by the user at the user terminal or alternatively, any one or more of ID card information, magnetic card information, and fingerprint, voiceprint, and iris print of the user.

In addition, it is one of the preferred embodiments of the present invention to determine a predetermined technique employed by the user for the purpose of user identification, thereby determining a level.

In addition, it is one of the preferred embodiments of the present invention to, determine the use based upon a predetermined instruction from the input device operated by the user at the use terminal and, in this case, determine the lowest certification level.

In addition, it is one of the preferred embodiments of the present invention to, if a current certification level of the user is lower than a desired certification level required for data acquisition, instruct the user to take action required to level up to the required certification level.

In addition, it is one of the preferred embodiments of the present invention to define a security level specific to the user information, thereby managing the user information for such each security level.

In addition, it is one of the preferred embodiments of the present invention to hold information common to a plurality of users who use the user terminals as group data to be associated with a security level.

In addition, it is one of the preferred embodiments of the present invention to, for a set of requested data, obtain an index as an ID from a distance between a probability of such an event and data, and then, use the obtained value to reconfirm a security.

In addition, it is one of the preferred embodiments of the present invention to classify in advance the plurality of user terminals into a plurality of security divisions, and to apply access restriction for such each security division of the user terminal that has made access based on determination of the security divisions.

In addition, it is one of the preferred embodiments of the present invention to determine the security division of the user terminal based on the registered number of users of the user terminal.

In addition, it is one of the preferred embodiments of the present invention to, when the security division falls into a predetermined division among said security divisions, when a certification level is changed to be lowered, delete data transmitted from the server to the user terminal before the certification level is changed to be lowered.

In addition, it is one of the preferred embodiments of the present invention to, when the security division falls into a predetermined division among said security divisions, automatically and/or periodically transmit data inputted from the user terminal to a predetermined work area of the server.

In addition, it is one of the preferred embodiments of the present invention that, a user information use criterion for a data requester is stored in advance, and a user information providing condition for a data provider is stored in advance, and when the user information use criterion and the user information providing condition are compared with each other, and transmission is controlled based on the comparison result, if user information other than that on a user determined by the user determination means is contained in data, the user information providing condition of the user is obtained, and comparison with the user information use criterion is carried out, thereby determining whether or not transmission is carried out.

In addition, it is one of the preferred embodiments of the present invention that the user information management apparatus accepts access to data at a access accepting section, determines access privilege relevant to data on such accepted access at an access privilege determining section, and further, change at an access management section the access privilege relevant to data on the accepted access at the access accepting section.

In addition, it is one of the preferred embodiments of the present invention that the presence or absence of access privilege at the access privilege determining section is determined based on an access privilege table in which data and access privilege are associated with each other.

In addition, it is one of the preferred embodiments of the present invention that the presence or absence of access privilege at the access privilege determining section is determined based on the access privilege described in data.

In addition, it is one of the preferred embodiments of the present invention that the access management section has access privilege change information output means to output information indicative of the changed access privilege.

In addition, it is one of the preferred embodiments of the present invention that the access determining section has access privilege change information acquiring means to acquire information from the access privilege change information output means.

In addition, it is one of the preferred embodiments of the present invention that the access accepting section accepts an access from a device, and the access privilege change information output means transmits information to the device.

In addition, it is one of the preferred embodiments of the present invention that an access privilege change condition acquiring section is provided to acquire a condition for changing access privilege.

In addition, it is one of the preferred embodiments of the present invention that a change in access privilege at the access privilege management section is made within the range of data that can be accessed.

In addition, it is one of the preferred embodiments of the present invention that an owner associated with data to be accessed at the access management section is changed.

In addition, it is one of the preferred embodiments of the present invention that the access management section is restored to the source access privilege after the completion of processing by a access change.

In addition, it is one of the preferred embodiments of the present invention that, when it is determined that an access at the access accepting section is provided without access privilege, there is provided a certification acquiring section that requests acquisition of access privilege.

In addition, it is one of the preferred embodiments of the present invention that a condition acquired by the access privilege change condition acquiring section is: any one of an access continuation time; data access count, an instruction from an accessing person; an instruction from an operating system; an instruction from an application program; an elapsed time after starting access; time information; and access rejection count; or alternatively, a combination of two or more thereof.

In addition, it is one of the preferred embodiments of the present invention that the user information management program causes a computer to accept data access in accordance with the access accepting step; to determine the presence or absence of access privilege in accordance with the access determining step; and to change according to the access management step the access privilege relevant to data on the accepted in accordance with the access accepting step.

In addition, it is one of the preferred embodiments of the present invention to, in the access management step, input information indicative of the changed access privilege.

In addition, it is one of the preferred embodiments of the present invention to acquire a condition for changing access privilege in the step of acquiring access privilege change information.

BRIEF DESCRIPTION OF THE DRAWINGS

FIG. 7 is a view showing an example of a description content (definition) stored in means for storing data specific security level in each of the embodiments according to the present invention.

FIG. 8 is a view showing an example of personal data in each of the embodiments according to the present invention.

FIG. 9 is a view showing an example of data of which an instance of level 1 is generated in each of the embodiments according to the present invention.

FIG. 10 is a view showing an example of data of which an instance of level 2 is generated in each of the embodiments according to the present invention.

FIG. 11 is a view showing an example of data of which an instance of level 3 is generated in each of the embodiments according to the present invention.

FIG. 12 is a view showing another example of a description content (definition) stored in means for storing a data specific security level in each of the present embodiments according to the present invention.

FIG. 13 is a schematic view showing a case in which access is made to an Electronic Commerce (EC) site via Internet, the figure including a part of FIG. 1.

FIG. 15 is a view showing contents of a screen displayed on a display of a user terminal in an example of FIG. 13.

FIG. 17 is a view showing contents of a screen displayed on a display of a user terminal in an example of FIG. 13.

FIG. 20 is a view showing an example of an access privilege table in which data and access privilege are associated with each other.

FIG. 22 is a view showing a state in which access privilege is described in data.

FIG. 23 is a view showing a state in which data is classified by owners, and the owners are described in the data.

FIG. 25 is a view showing an exemplary table indicating which owner's access privilege is required for current access privilege and required data title.

DETAILED DESCRIPTION OF THE INVENTION

Best Mode for Carrying Out the Invention

Hereinafter, preferred embodiments of the present invention will be described with reference to the accompanying drawings.

Figure 1:
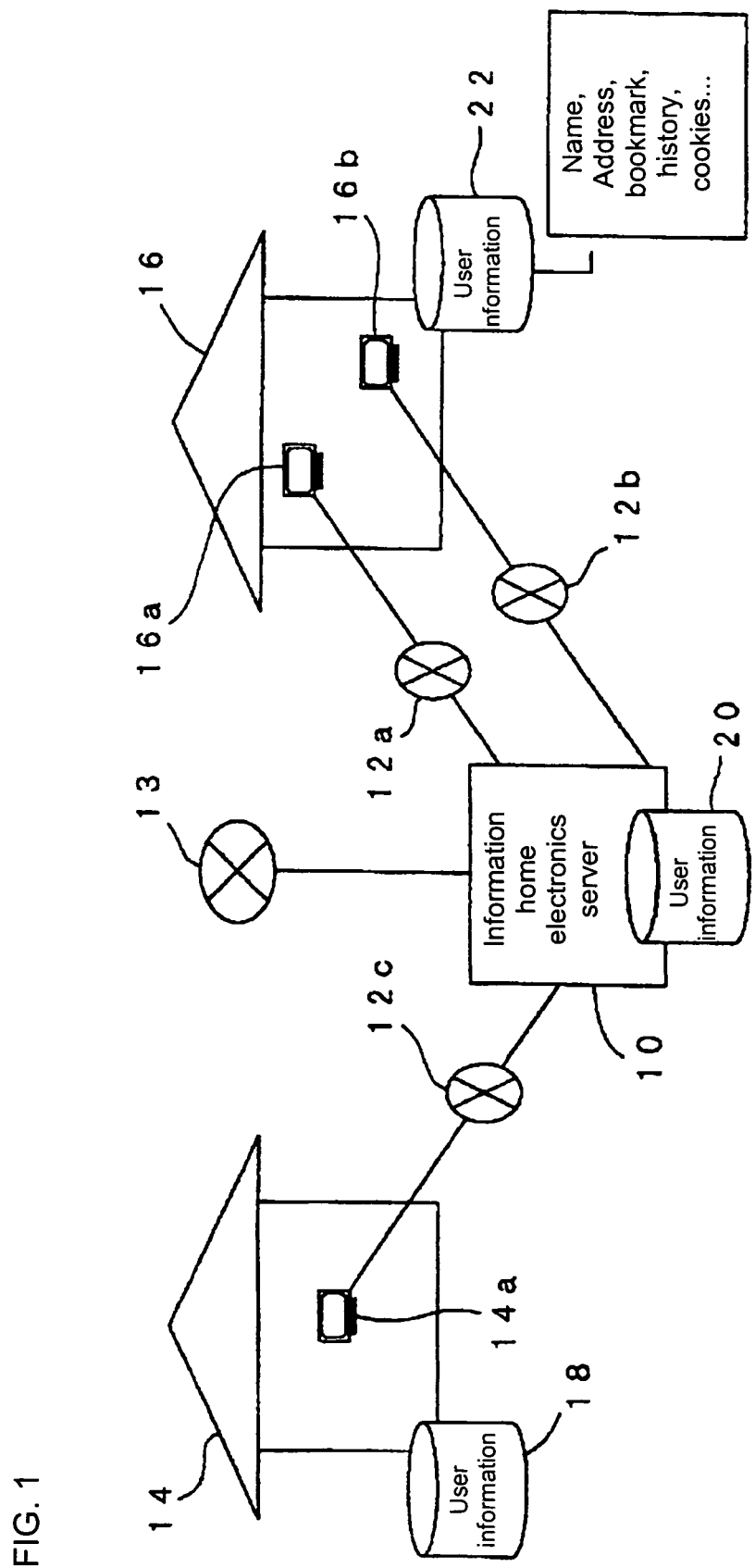
FIG. 1 is a schematic view showing an exemplary general configuration of a communication system to which a user information management apparatus according to the present invention is applied.

FIG. 1 is a schematic view showing one of the preferred embodiments (hereinafter, referred to as a first embodiment) of a user information management apparatus according to the present invention. In FIG. 1, an information home electronics server 10 is assumed to be connected to a plurality of user terminals 14a, 16a, and 16b that are at homes 14 and 16 of a plurality of users via digital communication lines 12a, 12b, and 12c (or a public line). Terminals 14a, 16a, and 16b each may be, e.g., a personal computer or may be a digital television (TV) capable of making bidirectional communication. Here, such a digital TV is assumed to be used.

The information home electronics server 10 has storage means 20 in which user information is assumed to be held. In addition, the user terminals 14a, 16a, and 16b of the homes 14 and 16 each are assumed to comprise storage means 18. Here, for clarity, only the storage means 18 and 22 provided at the user terminals 14a and 16b are assumed to be shown. These user terminals 14a, 16a, and 16b are substantially identical to each other in arrangement, and have the same functions. Thus, the following description will be given based on a relationship between the user terminal 16b and the server 10.

The user terminal 16b makes bidirectional communication via the information home electronics server 10. The information home electronics server 10 has an Internet connection function as an internet service provider provides. The user terminal 16b is arranged to make access to Internet 13 via the information home electronics server 10. In an example of FIG. 1, storage means 20 and 22 for holding and managing user information are provided at both of the information home electronics server 10 and user terminal 16b. These elements may exist in only either of the above terminal and server. User information can include: user's name, address, age, date of birth, gender, bookmark, history, cookie, credit card number or validity, past diseases/medical history or the like. The term "user information" or "personal information" includes the operation history of the user terminal 16b operated by the person as well as information identifying the person. Thus, the above term includes information or the like indicative of the past accessed Internet Web site. The user information management apparatus described below is constructed in the information home electronics server 10.

Figure 2:
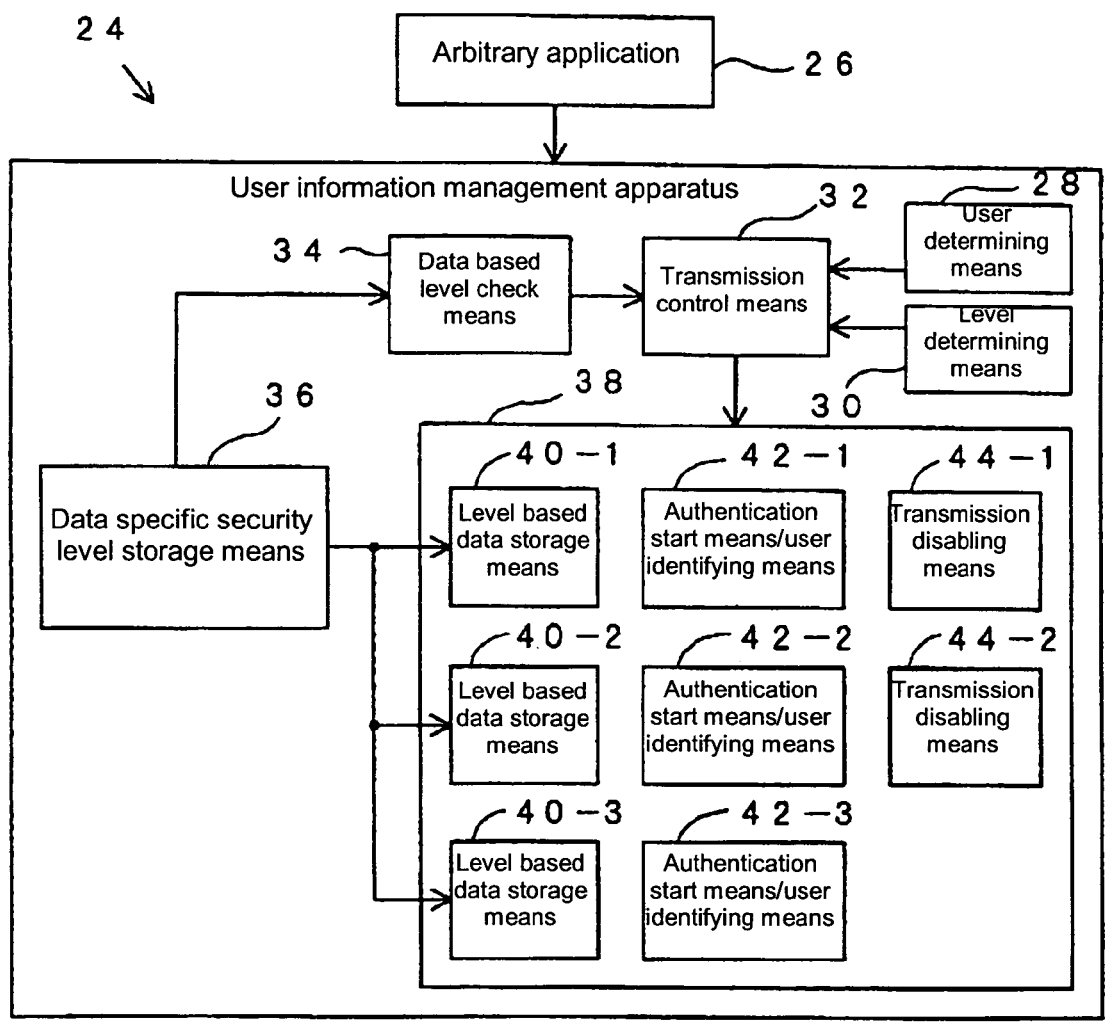
FIG. 2 is a schematic block diagram depicting a first embodiment of the user information management apparatus according to the present invention.

FIG. 2 is a schematic block diagram depicting an entire configuration of a user information management apparatus 24 constructed in the information home electronics server 10. Now, assume that the user terminal 16b makes access to the information home electronics server 10 by using an arbitrary application 26. The user information management apparatus 24 has user determining means 28, level determining means 30, transmission control means 32, data based level confirmation means 34, data specific security level storage means 36, and a level based data access object 38. The level based access object 38 has level based data storage sections 40-1 to 40-3, certification start means/user identifying means 42-1 to 42-3, and transmission disabling means 44-1 and 44-2.

Functions in the blocks are as follows.

Data specific security level storage means 36

This storage means is provided for holding user information relevant to a plurality of valid users to be associated with a security level.

Level based data storage means 40-1 to 40-3

These storage means are provided for holding data obtained by the data specific security level storage means, the data being accessible by a specific user at a specific security level. These means makes it possible to make access to user information with its security equal to or lower than a specified security level.

User determining means 28

This means is provided for determining a current user of a user terminal.

Level determining means 30

This means is provided for determining which of a plurality of predetermined certification levels corresponds to a current user of a terminal.

Transmission control means 32

This means is provided for acquiring user information based on a current certification level of a user upon the receipt of a user information acquisition request from an arbitrary application, or alternatively, if the user is not at a certification level required for data acquisition, calling user identifying means to level up the certification level, thereby acquiring and transmitting user information.

Transmission disabling means 44-1 and 44-2

These means are provided for selectively disabling transmission of data according to one of a plurality of certification levels.

Certification start means/user identifying means 42-1 to 42-3

These means are capable of storing any of a plurality of user identifying means, and calling the user identifying means according to a request from the transmission control means.

Data based level confirmation means 34

This means is provided for obtaining whether or not data obtained by the data specific security level storage means to be accessed requires any security level.

Arbitrary application 26

This application is provided for requesting user information to the user information management apparatus.

The user determining means 28 is provided for specifying a user based on information acquired by the certification means that a user uses at the user terminal 16b. The certification means used by the user is provided by inputting information contained in an integrated circuit (IC) card or magnetic card assigned to one user, or alternatively, a password. In addition, it is possible to carry out certification by using the user's fingerprint or iris print or facial image and the like. Therefore, the user terminal 16b comprises: a card reader (not shown) according to certification means to be used or an image acquisition device; and an interface or driving device thereof.

In the present invention, a plurality of certification levels are provided for each user. These levels are managed so as to differentiate the range of accessible data according to the certification level. That is, the certification start means/user identifying means 42-1 to 42-3 and the transmission disabling means 44-1 and 44-2 manage data that can be accessed at a certificated level. The term "certification start" used here denotes that certification is started at a predetermined level. The term "certification disabling" denotes that certification is terminated at a predetermined level.

Figure 3:
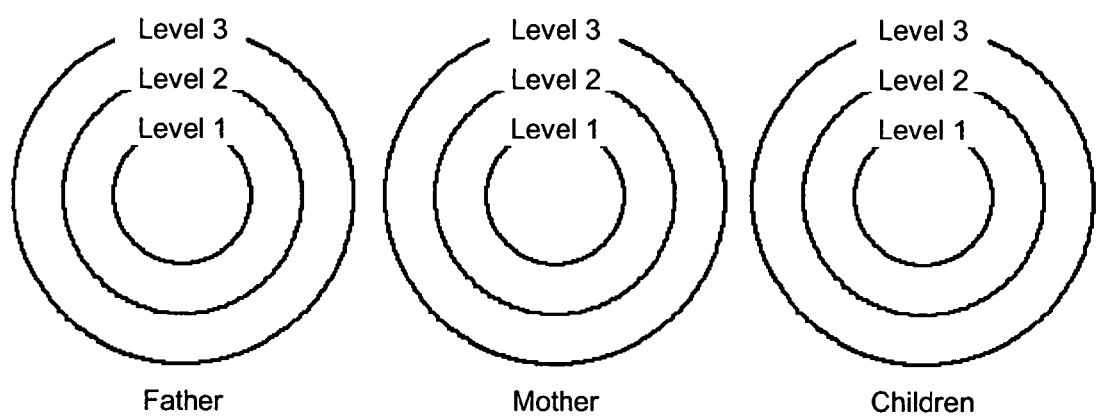
FIG. 3 is a schematic view illustrating a concept of a certification level in the present invention.

FIG. 3 is a schematic view showing a data scope when three certification levels are provided according to the present invention. According to a respective one of the security levels, the data in the range viewed from the top in the figure can be accessed. That is, at level 1 that is the highest security level, all the data from level 1 to level 3 can be accessed. Conversely, at level 3 that is the lowest security level, only the data at level 3 can be accessed. These three levels correspond to certification means used for user determination described above, respectively. When the user uses an IC card, level 1 is set. When the user inputs a password, level 2 is set. When the user uses neither of them, level 3 is set. Transmission disabling that is the end of certification is executed by an elapse (timeout) of a predetermined period of time, or alternatively, by executing a predetermined operation. The predetermined operation can include one data acquisition, for example.

The high or low certification level means the following. That is, at a high certification level, data can be accessed at its level or lower. That is, the range of accessible data is changed according to whether the certification level is high or low. At level 3 that is the lowest certification level, no transmission disabling means is provided. This is because certification is not terminated at level 3. In other words, even if the lowest level is set at a stage at which a user has been determined, level 3 is set. When the user inputs a password to the element 16b, and the inputted password is certificated by the information home electronics server 10, level 2 is set. Further, when the user inserts an IC card into the element 16b, and the card is certificated by the information home electronics server 10, level 3 is set. With an elapse of period of time, level 3 is changed to level 2, and further, level 2 is changed to level 1.

Now, a description will be given with respect to a case in which the predetermined data located in the information home electronics server 10 is accessed by means of the element 16b.

1. When an item of data is accessed, an accessing user is determined by the user determining means 28. Next, the certification level is confirmed by the level determining means 30, and the level based data access object 38 corresponding to the level is set to be active. In FIG. 2, for a respective one of these three levels, there is a data access object that consists of the level based data storage means, certification start means/user identifying means, and transmission disabling means (only level 1 and level 2).
2. The level based data storage sections 40-1 to 40-3 return a value if the value can be acquired. Otherwise, these sections return the corresponding error code.
3. If the error code is returned in the above step 2, the transmission control means 32 confirms a level required for such data access in the data based level confirmation means 34.
4. If a level based access object at the level obtained in the above step 3 is not active, the object is set to be active, and data is requested again. In addition, certification is started by the certification start means/user identifying means 42-1 to 42-3 of the level based data access object that has been set to be active. When certification is successfully started, data is requested to the level based data storage sections 40-1 to 40-3.
5. When using the level based data access object 38 that has already been set to be active, the certificated state is confirmed by the transmission disabling means 44-1 and 44-2. The transmission disabling means 44-1 and 44-2 determine whether certification is terminated by defined means such as timer or the end of session.

Providing a user change function in the certification start means makes it possible to change a user, for example, "son or daughter" →"mother" when an attempt is made to access to data on "level 1" in a state of "son or daughter, level 3". In this way, certification is required during level upgrading, and a user can be changed here. In addition, the level goes down automatically. At this time, data scope is changed according to the level.

Advantageous effects of the above configuration are as follows.

Once certification is made, all the data at the certification level and the lower security level than said security level can be accessed, and there is no need to carry out certification individually for applications or data.

Even if a certification level goes down due to timeout or the like, the privilege of the same user is not lost. User data at the lowest level can be accessed (in general, the privilege of the user is lost due to log-out).

SECOND EMBODIMENT

Figure 4:
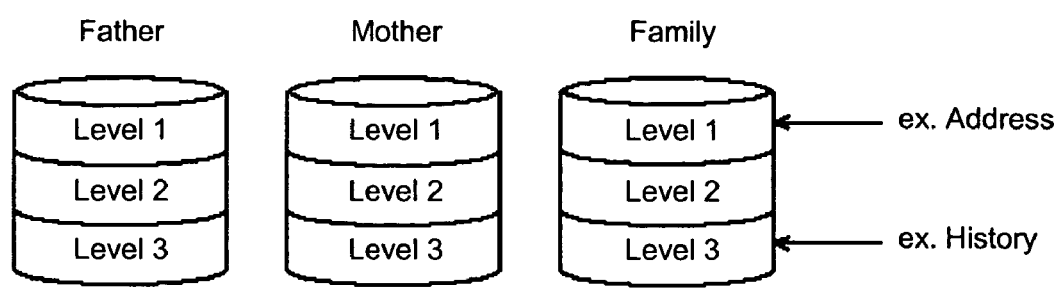
FIG. 4 is a schematic view illustrating a second embodiment of the user information management apparatus according to the present invention.
Figure 5:
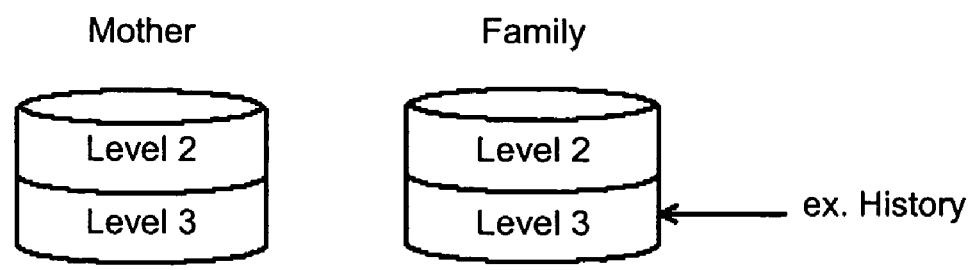
FIG. 5 is a schematic view illustrating an operation of the second embodiment of the user information management apparatus according to the present invention.

At the "level based data storage section" according to the first embodiment, when data is accessed by a specific user, data on a group to which the user belongs can be accessed in addition to personal data, as shown in FIG. 4. Further, personal data or group data can be defined for a respective one of data items. FIG. 5 shows an example of data scope when a mother makes access at level 2.

For example, data stored unconsciously such as history is defined as data at the lowest level in family, thereby making it unnecessary to switch a user while login is timed-out and left, and an unspecified number of users are browsing, and enable smooth operation (that is, user certification is first requested when personal data is accessed). In addition, data common to a family (such as address) is defined as group data, whereby common values can be shared. Personal data or group data can be defined for each item of data, whereby data can be defined according to the use of user identification, for example, according to whether a family carries out user identification periodically or hardly carried out it.

THIRD EMBODIMENT

At the "data specific security level storage means" 36 according to the first embodiment, a security level at a respective one of data items can be obtained. For example, a credit card number can be accessed at security level 1, and age or gender can be accessed at security level 2. Even if "age" or "gender" is singly provided, ID cannot be obtained. However, there is higher probability that a person can be identified if data is passed together. That is, "a person can be identified" based on a plurality of data items, thus requiring a high security level.

In the third embodiment, an index is obtained to be an ID from a probability of which such an event occurs and a distance between data items, and security reconfirmation is performed by using the obtained value. Although a single item of data can be determined to be accessible, reconfirmation of a data set is performed, thereby making it possible to determine whether the security is high or low.

An example thereof is shown below.

Index obtained to be ID when a single item of data is used=1−probability (for example, probability of "gender=female" is 0.5)

Index obtained to be ID when a pair of data items are used=1−probability "a" x (1−distance "ab" x (1−probability "b")), where Probability "a" ≦probability "b" holds, and Distance "ab" is a distance between data "a" and data "b", and is obtained by correlation.

Age and gender→Long distance

Age and income→Short distance

Similarly,

Index obtained to be ID when a plurality of data items are shared=1−probability "a" x (1−distance "ab" x (1−probability b)) x ... x (1−distance "yz" x (1−probability "z")), where Probability "a" ≦probability "b" ≦ ... ≦probability "z" holds, and "probability of which such an event occurs" is changed depending on a data value, and an average probability common to data may be used irrespective of the value (in order to improve a processing speed). A plurality of data may be passed at the same time or at different timings (however, a function for identifying an access source is required).

FOURTH EMBODIMENT

Figure 6:
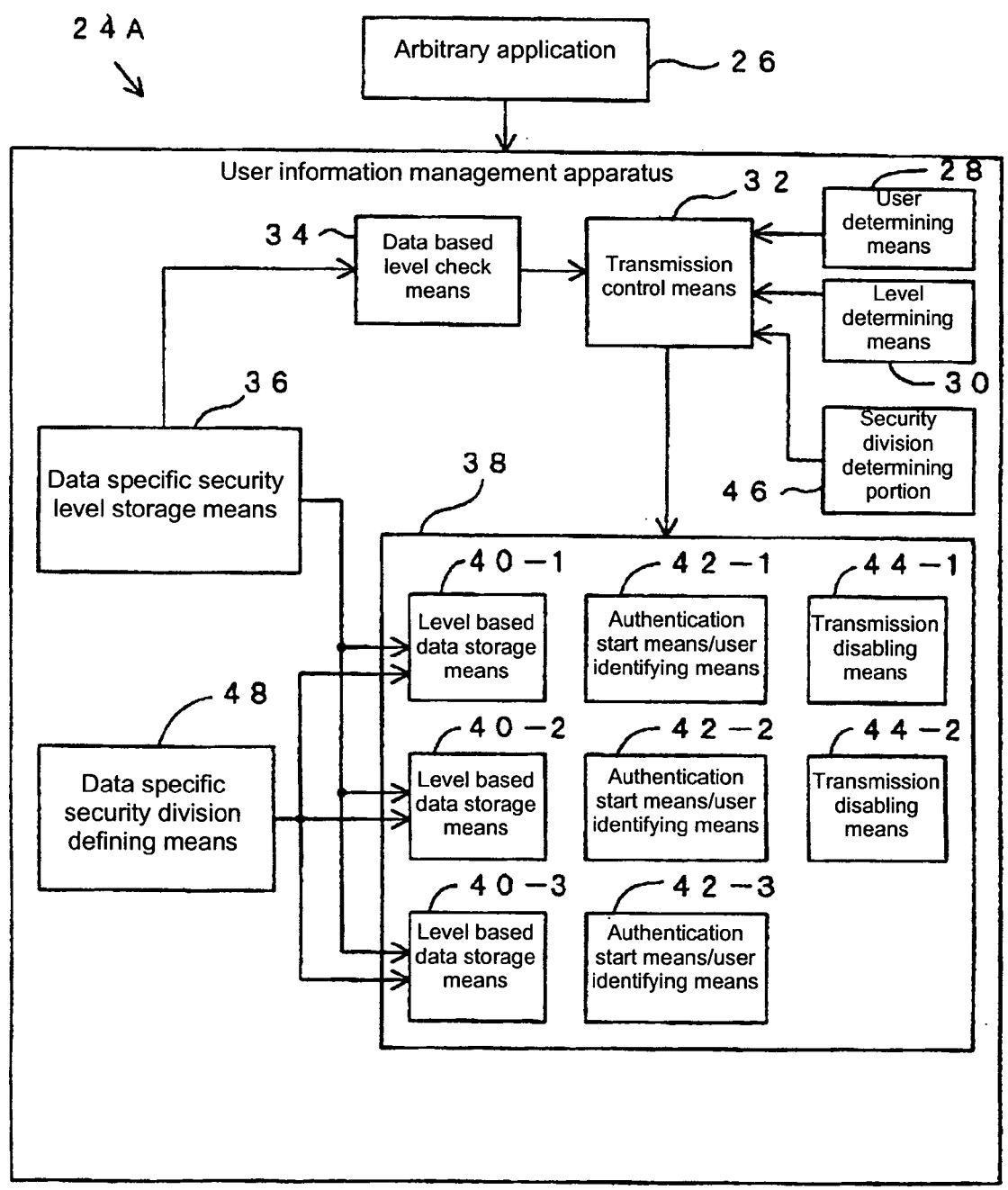
FIG. 6 is a schematic view showing a fourth embodiment of the user information management apparatus according to the present invention.

In comparison with the first embodiment, as shown in FIG. 6, in a user information management apparatus 24, there is provided a "security division determining section" 46 and "data specific security division defining means" 48 as well as "level determining means" 30 so that access can be limited for each security division. The data specific security division defining means 48 describes security division for each item of data. This means is used to determine whether or not transmission is enabled in comparison with the determined security division and a security division of requested data.

An example of security division is shown below. Security Division: Personal terminal, terminal at living room, and terminal at hotel or the like When login is carried out, the range of data to be transmitted based on terminal security division can be changed when history, bookmarks, cookies, or personal information and the like is transmitted from a server to a terminal.

FIFTH EMBODIMENT

In the fourth embodiment, user terminal security division is determined based on the registered number of users. That is, if no user is registered, it is determined as an unspecific majority as in a terminal at hotel.

SIXTH EMBODIMENT

In the fourth embodiment, according to the security division when a change is made to a low security level due to timeout or logout, data transmitted to a user terminal is deleted. That is, when a predetermined security division is obtained, when a security level is lowered, data transmitted in a state in which a security level is high is automatically deleted, thereby preventing distribution or illegal use of such data.

SEVENTH EMBODIMENT

In the first embodiment, data is periodically and automatically transmitted from a terminal to the server's personal information work space depending on a security level. If power is cut OFF suddenly, data being processed can be backed up. In addition, this backup processing is disabled depending on a security level, whereby ordinary processing can be performed smoothly, and only important data can be backed up.

EIGHTH EMBODIMENT

By using a P3P protocol, when personal information is passed to a Web site, security confirmation can be made by comparing a user policy (preference) and a Web site policy (the "P3P protocol" is disclosed on pp. 125 to 136, "Nikkei Internet Technology, January, 2000"). However, there is no system of confirming as to whether a user invades other privacy. In the eighth embodiment, as in an information home electronic server, in a system for managing personal information on a plurality of persons, data on the person concerning personal information of another person is searched, and it is determined whether or not such personal information may be transmitted by confirming a policy. When it is affirmatively determined, the data can be acquired.

Specifically, at the outside of transmission control means 32 in FIG. 2, there is provided: user information utilization criterion storage means; person based information providing condition storage means; a condition comparing section; and the user search means. Here, the user information utilization criterion storage means is provided as means for storing a criterion concerning how a user information requester utilizes received data. When a manager registered data in advance, and an arbitrary application requesting data during operation requires the data, this criterion is read out. The data utilizing method is used for the purpose of statistics, development, personal identification, or any other purpose than personal identification. The person based information providing condition storage means is provided as means for storing a providing condition for user information provider. When the condition for setting parameters for each person is registered in advance by a user, and an arbitrary application requesting data requests the data during operation, this condition is read out. Condition comparing means is provided means for determining whether or not user information may be provided by comparing the user information utilizing criterion read out as explained above and the personal based information providing condition.

This determination result is assigned to transmission control means 32. The user search means is provided as means for, after search is made for a user having user information requested according to a signal indicative of a data request from the transmission control means 32 in the case where the corresponding user can be obtained, access is provided to person based information providing condition storage means, thereby acquiring user information providing conditions for that user. The user described here denotes a user other than a user who is providing access to a user terminal 16b. When a user who is currently making access obtains information other than a user other than oneself, a signal indicative of "other users", for example, is transmitted to a user information management apparatus 24 of the server 10, and this signal is assigned to the user search means via the transmission control means 32. With this configuration, the transmission control means 32 carries out transmission control of user information based on the comparison result of the user information utilization criterion and user information providing condition as well as certification level based transmission control.

A specific example of operation will be shown below. For example, assume that a description field for family exists in a Web question and answer sheet. Personal data is searched for a respective one of families, the policy of each person in family is confirmed, and it is determined whether or not name, gender, age or the like may be passed to the Web site. When it is affirmatively determined, the respective values are obtained as a result.

Matters Common to the Present Embodiments

Now, matters common to the present embodiments will be further described. FIG. 7 shows an example of a description content (definition) to be stored in data specific security level storage means 36. This example is valid when access is made to data on a specific person. A plurality of definitions such as children data definition/adult data definition may be provided. In this description, a section described as <Dynamic access level="3") indicates that this specific data is at level 3.

FIG. 8 shows an example of personal data stored similarly in the data specific security level storage means 36. Each item of data shown in FIG. 7 and FIG. 8 described above is provided as an item to be registered immediately after purchasing the user terminal 16b. That is, a user oneself can describe these items of data by providing access to the information home electronics server 10. Alternatively, the user describes family data in the question and answer sheet, and delivers it to a manager of the information home electronics server 10, whereby the manager may register it.

After the above registration, when a data request is made from the user terminal 16b during actual use, a data attribute definition and person based data are analyzed, and data as shown in FIG. 9 to FIG. 11 is produced. For elements in which access levels are set to both of them, priority may be assigned to the user access level or priority may be assigned to an item with its high level. FIG. 9 to FIG. 11 show a data example when instances with level 1 to level 3 are generated.

For example, in FIG. 9, for level 1, the data may indicate the user's gender. In FIG. 10, for level 2, the data may indicate the user's first and last names. In FIG. 11, for level 3, the data may indicate a web address or URL.

FIG. 12 shows another example of description contents (definitions) stored in the data specific security level storage means 36. This example is effective when an unspecified number of data items are acquired one time. During data registration, the data is stored in a database (DB) divided at a security level. The security level is determined from a value defined in data definition and a value individually specified during data registration.

Specific Example When the Present Invention is Used for EC Site Shopping

Figure 14:
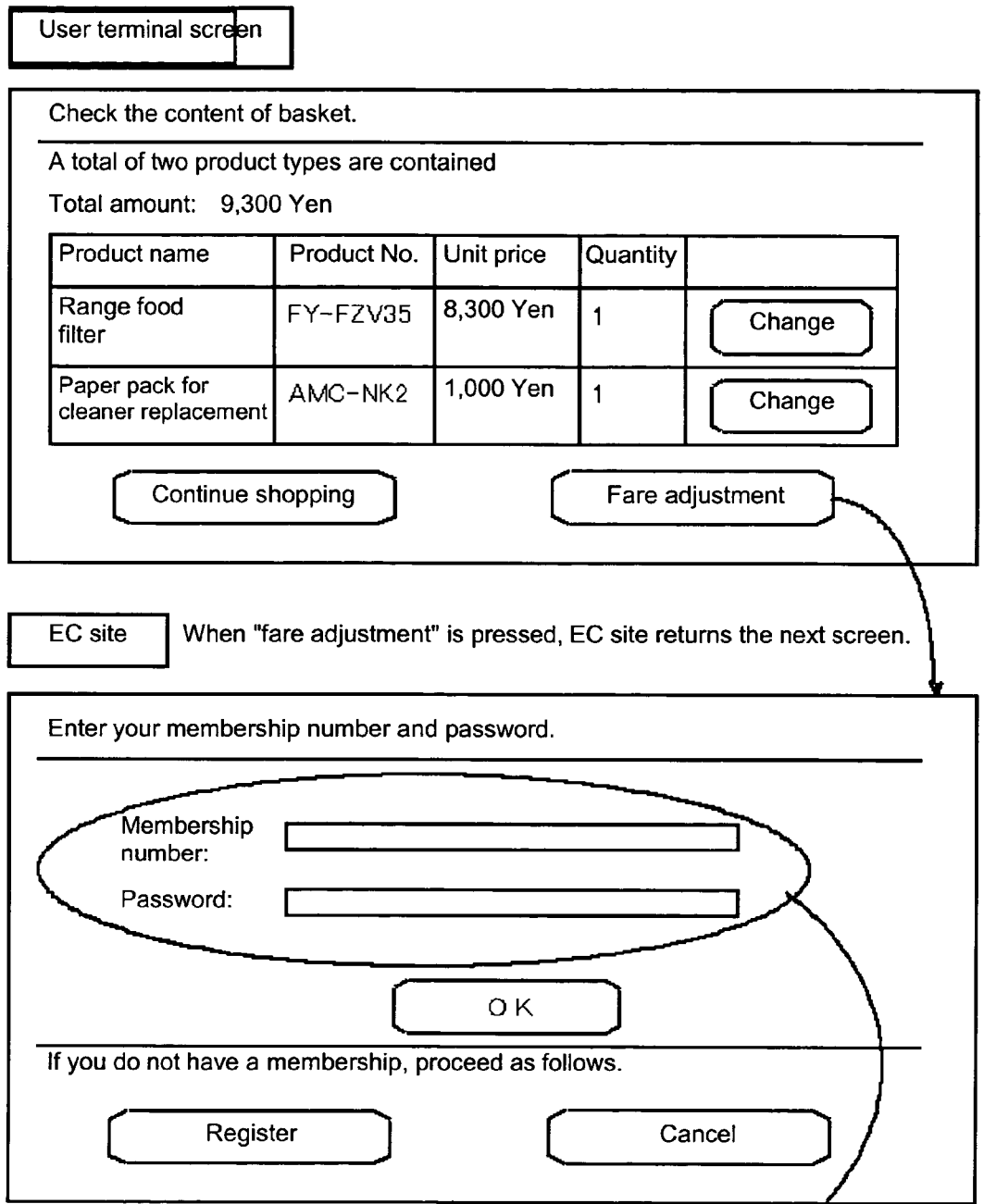
FIG. 14 is a view showing contents of a screen displayed on a display of a user terminal in an example of FIG. 13.

Now, a case of providing access to an EC (Electronic Commerce) site using the present invention for shopping will be described. FIG. 13 includes a part of FIG. 1, and is a view showing a case in which access is made to an EC site 50 via Internet 13. FIG. 14 shows the content of a screen displayed on a display of a user terminal 16b. Assume that the user selects a remote control button or a user specification portion on the screen, thereby providing access to the user terminal 16b. The current level of the user is set as level 3. Here, when an attempt is made to execute shopping, if a button section "fare adjustment" in the screen is clicked, the current screen is changed to a screen for prompting membership number and password entries. That is, it is required to level up the current level to level 1 to a user which the user information management apparatus 24 is accessing at level 3. Thus, input of these items of information is requested.

A series of operations at the user information management apparatus 24 is described below.

The security level of FooShop. User ID and FooShop. UserPasswd is set to 1.
1. It is found that a level based data access object at current level 3 already exists, and level 3 is kept unchanged when transmission disabling means 44-1 and 44-2 is confirmed.
2. FooShop. UserID and FooShop. UserPasswd are requested for a level based data access object.
3. An error is returned.
4. When the security level of FooShop. UserID and FooShop. UserPasswd is obtained by a data based level confirmation section, it is found that level 1 is set.
5. The level determining section generates a level based data access object of level 1.
6. Certification means set at the certification start means 42-1 is called.
7. The screen of FIG. 15 is displayed on the display of the user terminal 16b.
8. After certification has normally terminated, when FooShop. UserID and FooShop. UserPasswd are requested, the value is obtained.
9. The value obtained for a source code is compensated.
   <INPUT TYPE="text" NAME="FooShop. UserID" value="11223344">
   <INPUT TYPE="password" NAME="FooShop. UserPasswd" value="55667788">
10. A document having a corrected value is delivered to a user.

Figure 16:
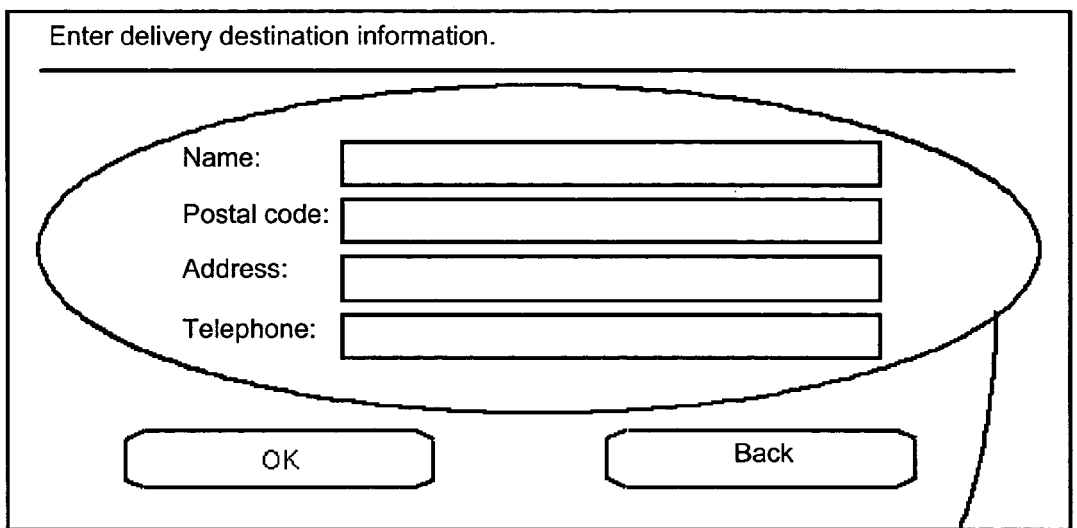
FIG. 16 is a view showing contents of a screen displayed on a display of a user terminal in an example of FIG. 13.

As a result, the screen at the bottom of FIG. 14 is displayed on the display of the user terminal 16b. When the user presses OK, the EC server returns the screen shown in FIG. 16. Next, the user information management apparatus 24 obtains the user information as follows.

The security level of User. Name, User. Postal. Postalcode, User. Postal. Formatted, and User. Telecom. Telephone is set to 2.
1. In checking transmission disabling means 44-1 of the current level based data access object of level 1, it is found that level 1 is invalid.
2. The level based data access object of level 2 is generated.
3. User. Name, User. Postal. Postalcode, User. Postal. Formatted, and User Telecom. Telephone are requested to the level based data access object.
4. The value obtained for the source code is corrected.
   <INPUT TYPE="text" NAME="User. Name" value="=Taro Yamada">
   <INPUT TYPE="text" NAME="User. Postal. Postalcode" value="123-0000">
   <INPUT TYPE="text" NAME="User. Postal. Formatted" value="Tokyo . . . ">
   <INPUT TYPE="text" NAME="User. Telecom. Telephone " value="03-1234-5678">
5. A document having its corrected value is delivered to a user.

As a result, the screen as shown in FIG. 17 is displayed at the display of the user terminal 16b.

In the present embodiments each, although a description has been given assuming that the user information management apparatus 24 is constructed over the information home electronics server 10, the user information management apparatus 24 may be constructed at the user terminals 14a, 16a, and 16b. In this case as well, an operation similar to that described above can be carried out.

NINTH EMBODIMENT

Figure 18:
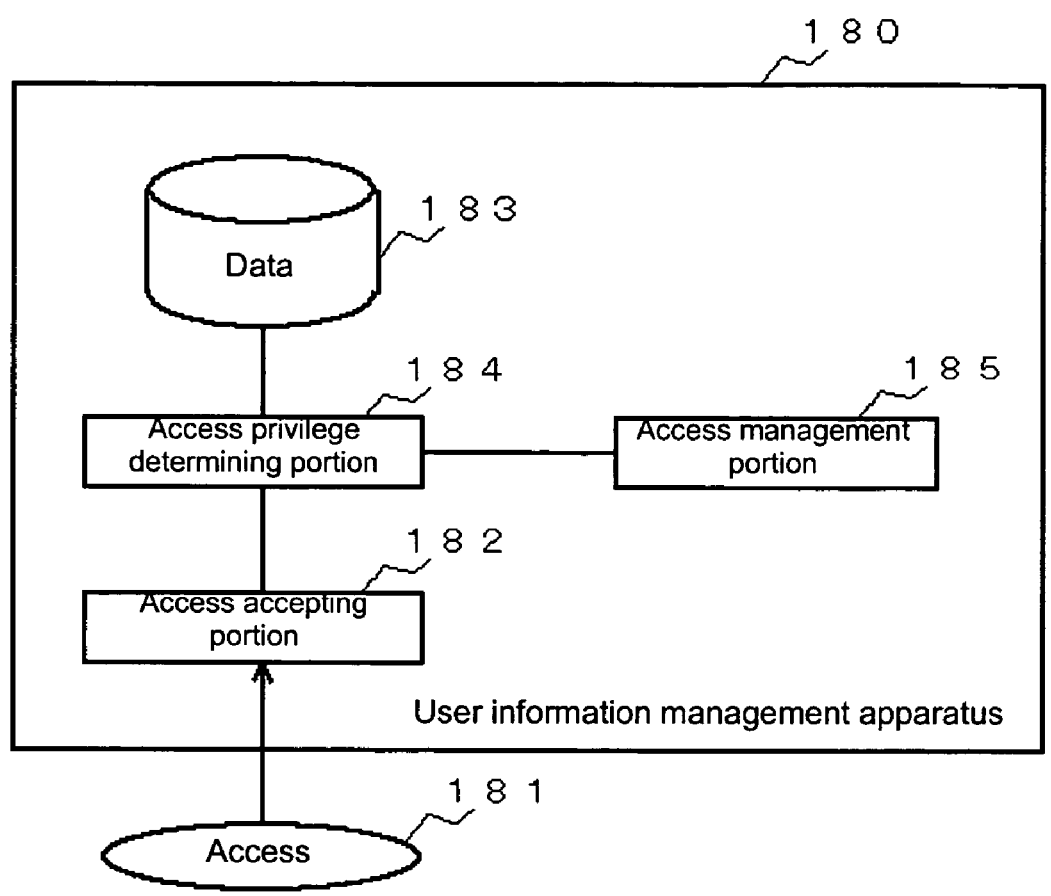
FIG. 18 is a schematic block diagram depicting a ninth embodiment of the user information management apparatus according to the present invention.

FIG. 18 is a functional block diagram depicting a user information management apparatus according to a ninth embodiment. A user information management apparatus 180 is composed of an access accepting section 182, an access privilege determining section 184, and an access management section 185.

The access accepting section 182 accepts an access 181 to data 183. Data 183 may be present inside or outside of the user management apparatus 180, as shown in FIG. 18. The "access" accepted by the access accepting section 182 used here denotes an instruction or command for applying processing to the data. An example of such an instruction or command includes: data readout, data writing, deleting, making a copy, changing contents, or alternatively, newly adding data.

The access privilege determining section 184 determines the presence or absence of access privilege for the data access accepted at the access accepting section 182. That is, an access privilege of an entity causing the access accepting section 182 to accept an access, or alternatively, an access privilege of the user information management apparatus 180 itself is compared with an access privilege of data specified by access 181, and it is determined whether or not access to data by means of the access 181 is permitted.

An access management section 185 makes a change in access privilege for data on the access 181 accepted at the access accepting section 182. The "access privilege for data on the access 181 accepted at the access accepting section 182" denotes access privilege stored in the user information management apparatus 180 when the access privilege determining section 184 determines whether or not data access by the access 181 accepted at the access accepting section 182 is valid. The access management section 185 changes access privilege stored in the user information management apparatus 180. As described previously, when the access privilege determining section 184 determines the presence or the absence of access privilege, the access privilege of an entity causing the access accepting section 182 to accept access is compared with the access privilege of data specified by the access 181, or alternatively, the access privilege of the user information management apparatus 180 itself is compared with the access privilege of data specified by the access 181. Therefore, in the former case, the access management section 185 changes the access privilege of the entity having caused the access accepting section 182 to accept access. In addition, in the latter case, the access management section 185 changes the access privilege of the user information management apparatus 180 itself.

Figure 19:
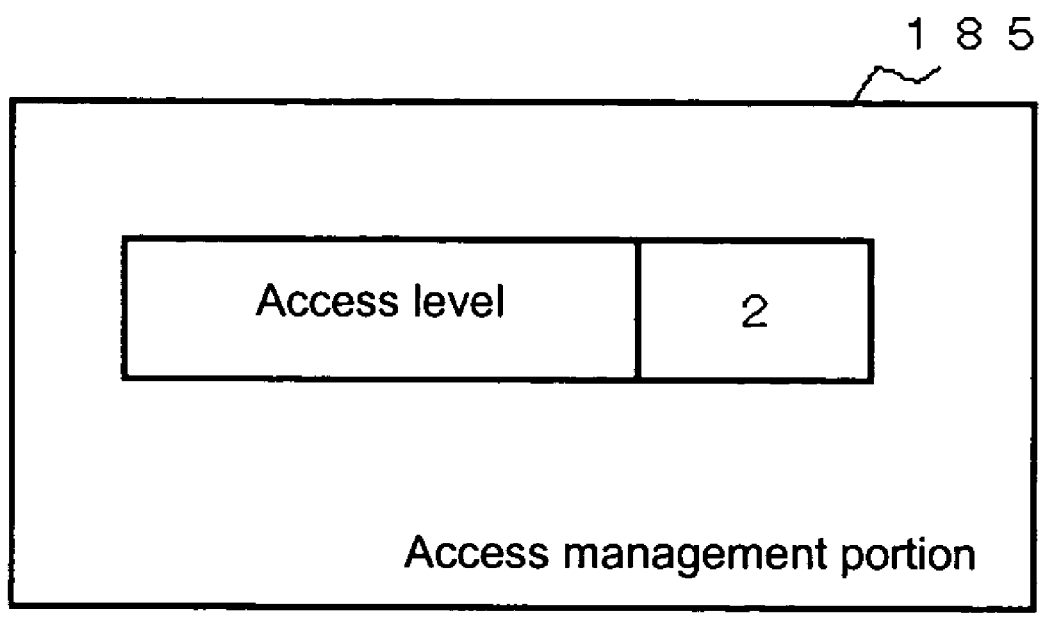
FIG. 19 is a view showing an example when an access management section in the ninth embodiment of the user information management apparatus according to the present invention stores access privilege.

In order for the access management section 185 to make a change in access privilege, it is required that access privilege making such a change is stored. As one method, as shown in FIG. 19, there is provided a method for storing access privilege in the access management section 185, and then, changing the thus stored access privilege. The foregoing description will be given assuming that access privilege is stored inside of the access management section 185. The following description is applicable to a case in which the access privilege is stored outside of the access management section 185 as well. In FIG. 19, the access privilege is stored as an "access level". When the access privilege is stored as an access level, an access level required for access is assigned to data to be accessed. If the access level stored in the access management section 185 is at the access level assigned to data or higher, the access privilege determining section 184 determines that the access privilege is provided.

FIG. 20 shows an example of an access privilege table having data and access privilege associated therewith. Each line of this table indicates what type of data and what access level must be stored by the access management section 185. For example, line 1 of the table in FIG. 20 indicates that access level required for data A is 1. Therefore, in order to make access to data A, the access level must be 1 or higher at the access management section 185. In FIG. 3, access level 1 is the highest access level. In the present embodiment, for explanation, access level 1 is the lowest access level, and as the access level is higher in numeral, the access level required for access is higher.

Figure 21:
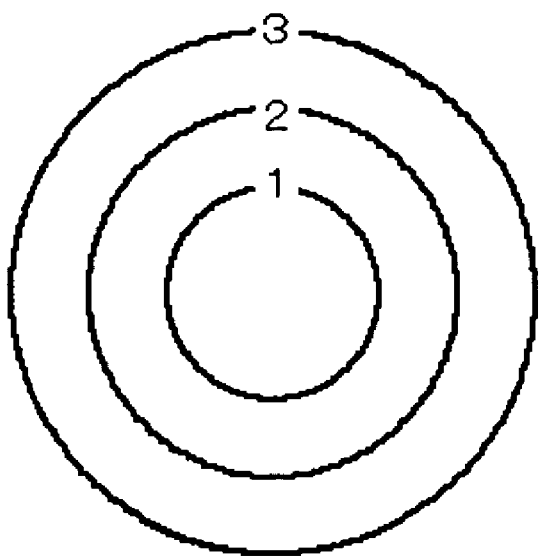
FIG. 21 is a schematic view illustrating that a range of data that can be accessed is broadened or narrowed depending on an access level.

In this way, the access level equal to or higher than access level assigned to data must be stored in the access management section 185. That is, the range of accessible data when access level 2 is stored in the access management section 185 is wider than that when access level 1 is stored in the access management section 185. Further, the range of accessible data when 3 is stored is wider than that when access level 2 is stored. Schematically, as shown in FIG. 21, higher access level includes lower access level.

In the foregoing, there has been depicted a schematic diagram in which, if the stored access level is high, access can be made to data requiring lower access privilege, data access can be made only when the stored access level is equal to the access level of data to be accessed. In this case, even if high access level is stored, no access can be made to data requiring low access level. As a result, unlimited data access can be prevented.

FIG. 20 shows an example in which an access level that is an access privilege is assigned by a table to a data being thus accessed. However, there is a case in which access privilege is described in data itself, the access privilege determining section 184 determines the presence or absence of access privilege based on the access privilege described in data itself. FIG. 22 shows an example when access privilege is described in data itself. In FIG. 22, data A indicates data representing yearly income. Such data representing yearly income is provided as data concerning privacy, in particular. Thus, high access level 3 is described. In addition, data B indicates data representing address. This data is lower than yearly income in security level. Thus, access level 1 lower than that of yearly income is described. Data C indicates data on name. This data is higher than address in security level, and is lower than yearly income in security level. Thus, access level 2 is set.

In addition, data to be accessed may be classified by owners. FIG. 23 illustrates an example of such classification in which the owner of data A is described as X, the owner of data B is described as Y, and the owner of data C is described as Z. Of course, as shown in FIG. 20, a table for associating data with its owner may be used without describing the data owner in data.

Figure 24:
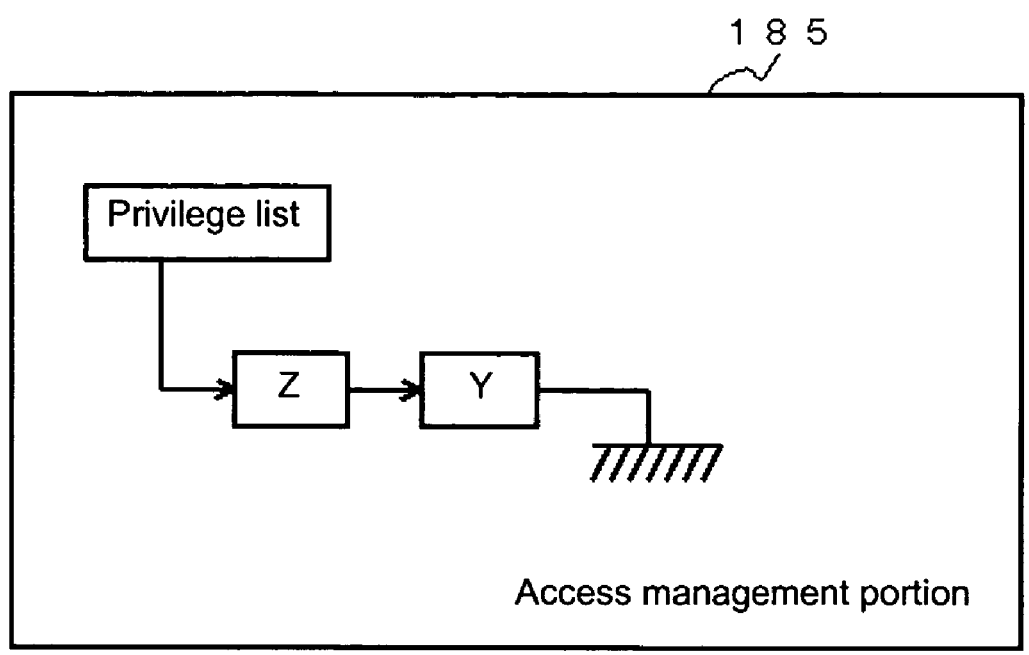
FIG. 24 is a view showing a state in which the access management section in the ninth embodiment of the user information management apparatus according to the present invention stores a privilege list that holds owners whose data can be accessed.

When the data accessed is thus classified by owners, the access management section 185 stores which owner's data can be currently accessed as access privilege. FIG. 24 shows an example when the owner of data that can be accessed as a "privilege list" is stored in the access management section 185 with a list structure. In this example, Z or Y has privilege to make access to data of the owners. When the privilege list is thus stored in the access management section 185, access privilege change includes a change of access to another owner's data associated with data being accessed. That is, the owner associated with data to be accessed is added to the privilege list, or alternatively, the entire privilege list is replaced with the owner associated with data to be accessed.

When the data accessed is thus classified by owners, and it is stored which owner's data can be currently accessed as access privilege, when a need to make access to one item of data occurs, it is possible to know what access privilege should be obtained from the current access privilege and data required to be accessed. FIG. 25 shows an example of a table showing what access privilege should be obtained from the current access privilege and data required to be accessed. For example, line 1 of the table consists of three items of data (Z, credit card number, and X). This indicates that, when the current access privilege is Z, and the required data is credit card number, the access privilege of X is required to access data on credit card number. Therefore, when the access privilege of Z is stored in the access management section 185, the credit card number is required. When an attempt is made to access the credit card number, the access number of X is required. If the access privilege of X is not stored in the access management section 185, processing for acquiring the access number of X can be initiated.

A case in which access level is used as access privilege and a case in which the owner is used are not in an exclusive relationship, it is possible to combine these two cases with each other. For example, it is possible to classify data by owners and to individually make the access level to the data classified by the same owner. In addition, conversely, data is classified by access levels, whereby the owner can be assigned to data classified at the same access level. In this case, the presence or absence of access privilege is determined by comparing the data access level and the access level stored in the access management section 185 and by comparing the data owner with the owner stored in the access management section 185.

Figure 26:
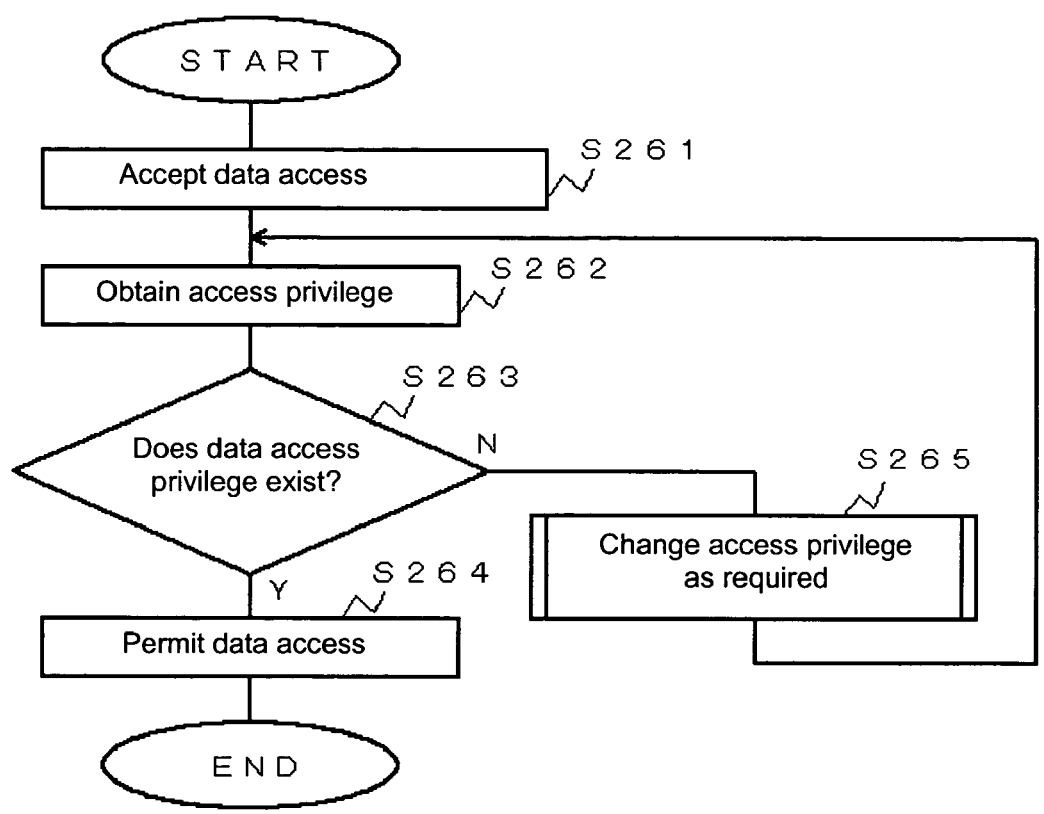
FIG. 26 is a flow chart showing a process for accepting access determining the presence or absence of access privilege, and changing the access privilege of the accepted access.
Figure 27:
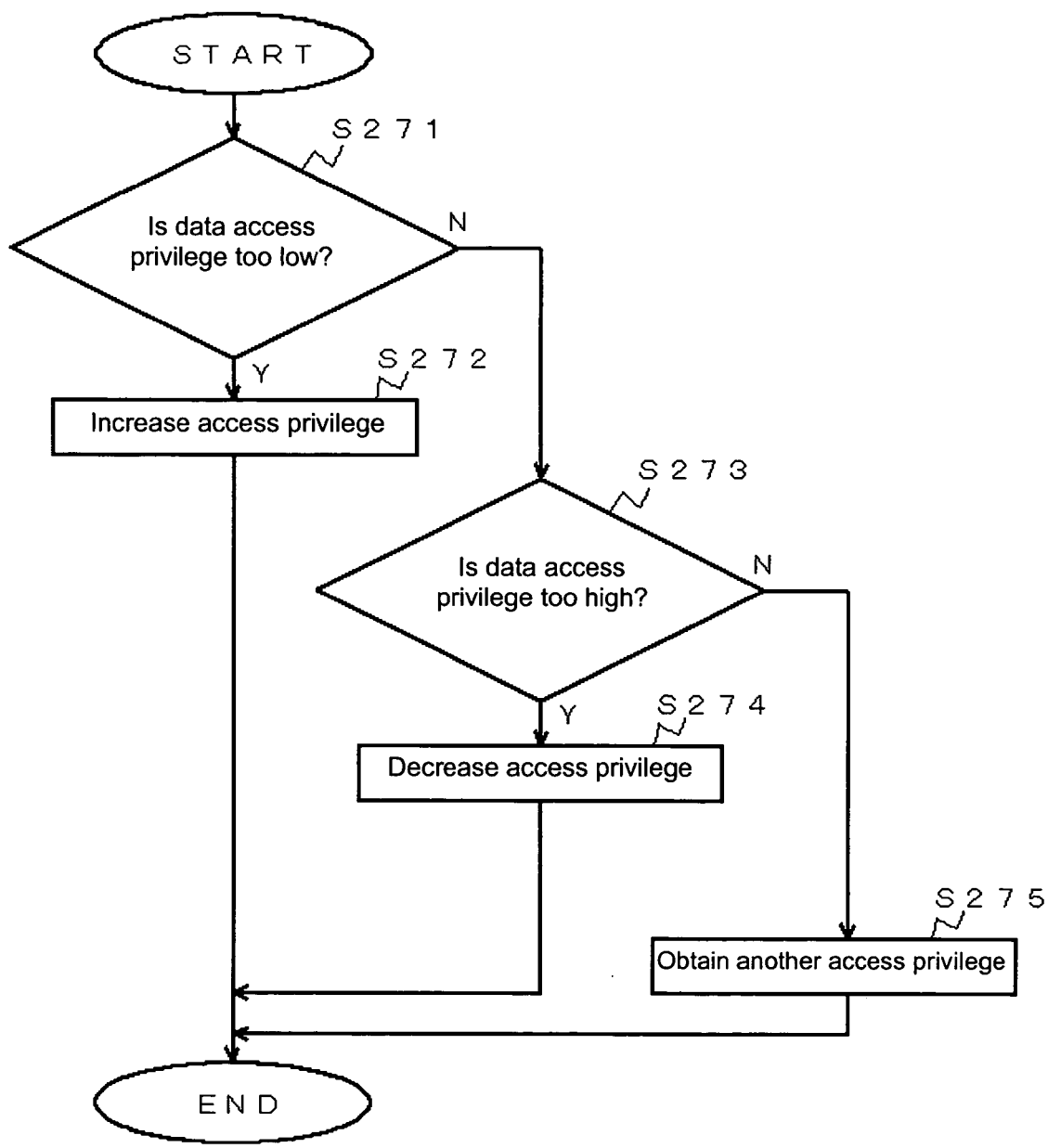
FIG. 27 is a flow chart showing a process for changing access privilege of the accepted access.

FIG. 26 and FIG. 27 are flow charts each illustrating processing for, when the access level and owner are thus used as access privilege, accepting data access, and then, determining the presence or absence of access privilege, or alternatively, processing for, if it is determined that no access privilege exists, adjusting access privilege.

At the step S261, data access is accepted.

At the step S262, access privilege is obtained. That is, the access privilege stored in the access management section 185 is obtained.

At the step S263, the access privilege required for data access is compared with that obtained at the step S262, and it is determined whether or not data access privilege is present. When the access privilege exists, processing goes to the step S264 at which data access is permitted.

At the step S263, when it is determined that no data access privilege exists, processing goes to the step S265 at which access privilege is changed as required.

A flow chart illustrating processing for changing access privilege as required is shown in FIG. 27.

At the step S271, it is determined whether or not data access privilege is too low. That is, it is determined whether or not the access level stored in the access management section 185 is lower than that of data to be accessed. If it is determined that the access level is lower, processing goes to the step 272 and processing for increasing the access level that is access privilege is carried out. For example, certification for increasing access level is carried out.

When it is determined that the data access privilege is not too low at the step S271, processing goes to the step S273 at which the data access privilege is determined whether or not it is too high. That is, it is determined whether or not access cannot be made because the access level stored in the access management section 185 is higher than the access level required to access data. If so, processing goes to the step S274 at which access privilege obtained as an access level is lowered.

At the step S273, when it is determined that the data access privilege is not too high, i.e., when the stored access level is equal to the access level that is the access privilege of data to be accessed, the stored owner is different from the data owner. Thus, processing goes to the step S275 at which another access privilege is obtained. That is, access privilege of another owner is obtained.

When data access is made in accordance with such a processing, and data has not been successfully accessed for a reason such as the absence of access privilege, an adjustment work of acquiring another access privilege is carried out, and data access is retried. Thus, an occurrence of an error or interruption of processing for a reason such as the absence of access privilege is eliminated.

In FIG. 27, it is assumed that, if the access level stored in the access management section 185 is not equal to the access level required to access data, it is determined that no access privilege exists. However, when it is determined that access privilege exists if the access level stored in the access management section 185 is equal to or greater than the access level required to access data, the steps S273 and S274 are not required. When processing goes to the branch of N at the step S271, processing may go to the step S275. In addition, in FIG. 27, although it is judged whether or not access privilege exists at both of the access level and owner, it is easy to cause modification so that the flow chart of FIG. 27 can be applied to a case in which determination is made by only access levels or a case in which determination is made by only owners.

In addition, at the steps S272, S274, and S275, in changing access privilege, the access privilege before modified is stored, data access is then retried, and thereafter, the access privilege before modified at the steps S272, S274, and S275 can be restored. By doing this, even high access privilege is temporarily obtained, it is guaranteed that the original access privilege is restored. Thus, work is carried out while high access privilege is kept unchanged, and unpredictable data can be prevented from being read out or data can be prevented from being damaged.

Figure 28:
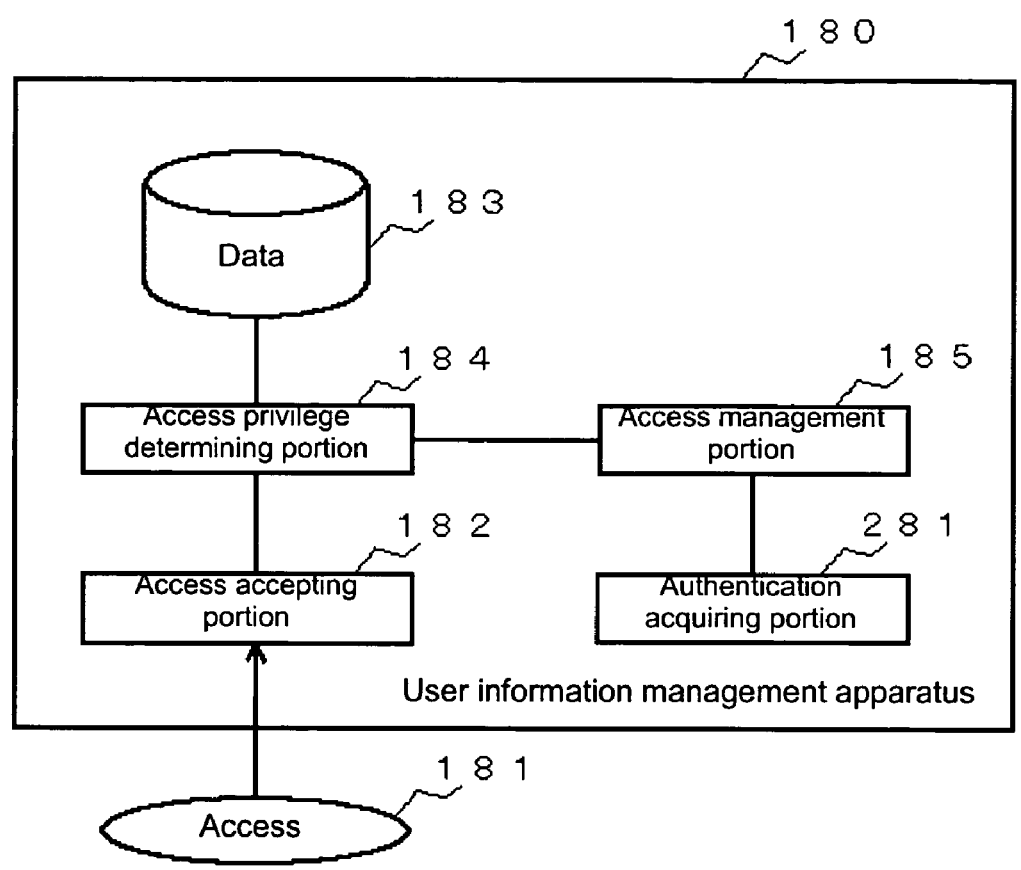
FIG. 28 is a schematic block diagram depicting a case in which the ninth embodiment of the user information management apparatus according to the present invention comprises a certification acquiring section.
Figure 29:
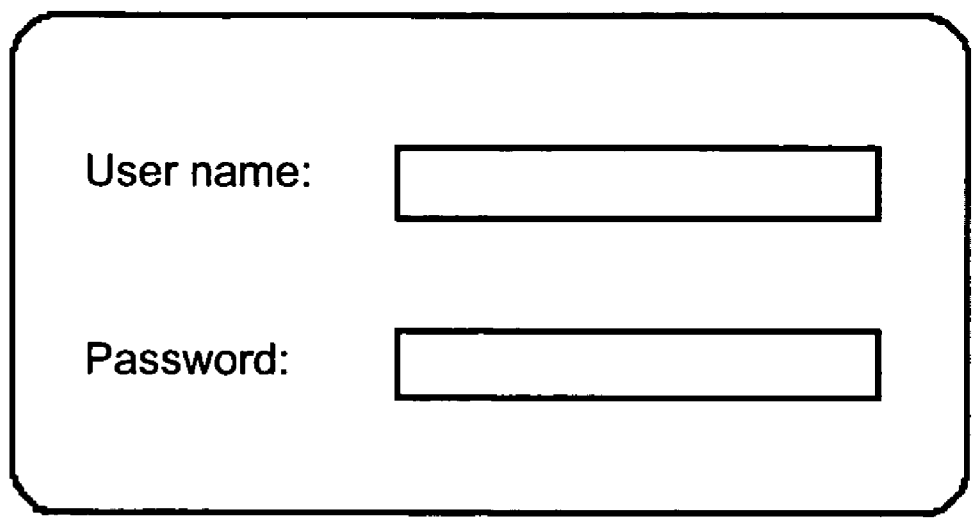
FIG. 29 is a view showing an exemplary certification screen for acquiring access privilege.

At the steps S272, S274, and S275, as shown in FIG. 28, the user information management apparatus 180 may comprise a certification acquiring section 281 in order to change access privilege. That is, when the certification acquiring section 281 requests acquisition of access privilege when the access privilege determining section 184 judges that the access at the access accepting section 182 is invalid. For example, when a display and a keyboard are connected to the user information management apparatus 180, the certification acquiring section 281 causes the display to display a screen for prompting entries of user name and password as shown in FIG. 29. Then, it is determined whether or not the user name and password entered by the user with the keyboard are valid. When it is determined that the entries are valid, a request for changing access privilege is made to the access management section. Alternatively, if the user information management apparatus 180 has a section for accepting an IC card, the certification acquiring section 281 carries out certification using the IC card so as to make a request for changing the access privilege for the access management section. In addition, the display and keyboard for carrying out certification may not be directly connected to the user information management apparatus 180, and a terminal device may be connected to the user information management apparatus 180. In this case, the certification acquiring section 281 transmits a request for acquiring certification to the terminal device. Then, the terminal device carries out certification using the password or IC card according to the request for acquiring certification, and transmits the result to the certification acquiring section 281. The terminal device carries out independently of the operation of the certification acquiring section 281, and the result of such certification is transmitted together with access 181 causing the access accepting section 182 of the user information management apparatus 180 to accept so that the certification acquiring section 281 acquires the result of such certification. As a result, certification caused by access privilege change can be carried out by the user information management apparatus 180 being a processing entity. In addition, this certification can be carried out by a terminal other than the user information management apparatus 180 being a processing entity.

When the user information management apparatus 180 comprises the certification acquiring section 281, and processing shown in FIG. 26 and FIG. 27 is thus carried out, whereby the access privilege determining section 184 determines that access is invalid (step S263), the access management section 185 carries out certification for making a change in access privilege. When such certification is successful, access privilege change is made (at the steps S272, S274, and S275), data access can be made. Thus, the access privilege can be changed smoothly without the entire processing being interrupted by the absence of access privilege. In addition, the access privilege is changed only when certification is correctly carried out, thus, disabling illegal access.

Figure 30:
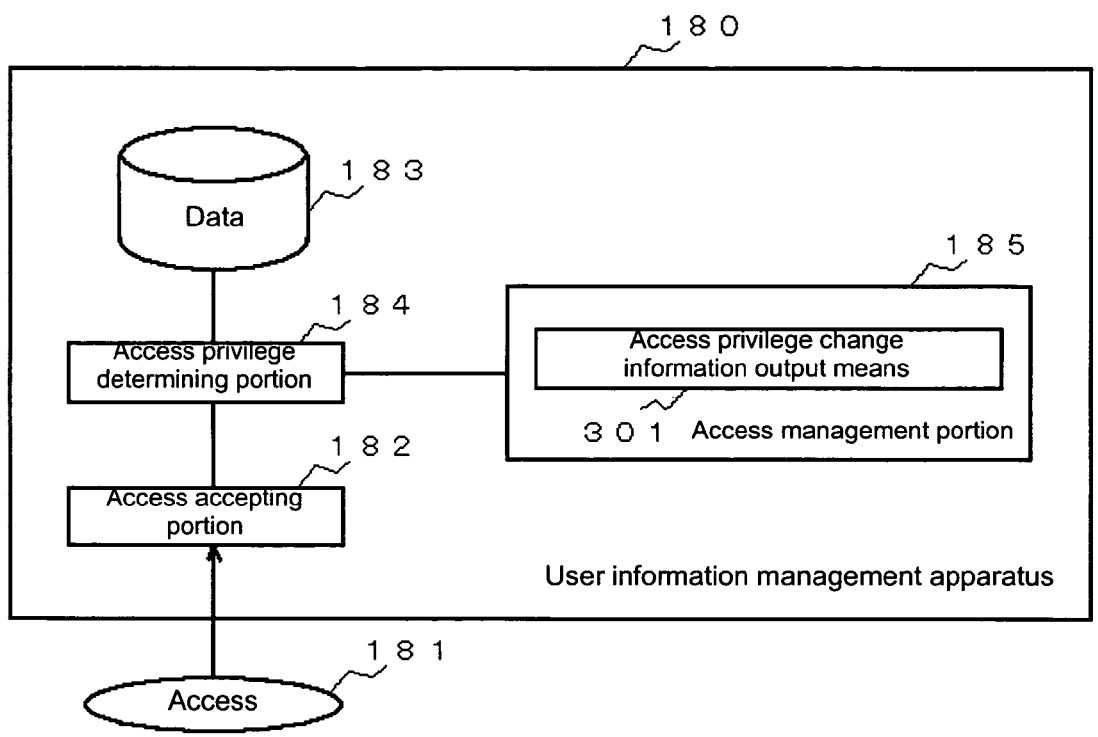
FIG. 30 is a schematic block diagram depicting a case in which the ninth embodiment of the user information management apparatus according to the present invention comprises access privilege change information output means.

The access management section 185 may comprise access privilege change information output means 301, as shown in FIG. 30. The access privilege change information output means 301 outputs access privilege change information if the access management section 185 has changed access privilege. The access privilege change information is obtained as information indicative of the changed access privilege. For example, this information indicates only the fact that access privilege has been changed, or alternatively, the information indicates what access privilege is stored due to change of access privilege.

Figure 31:
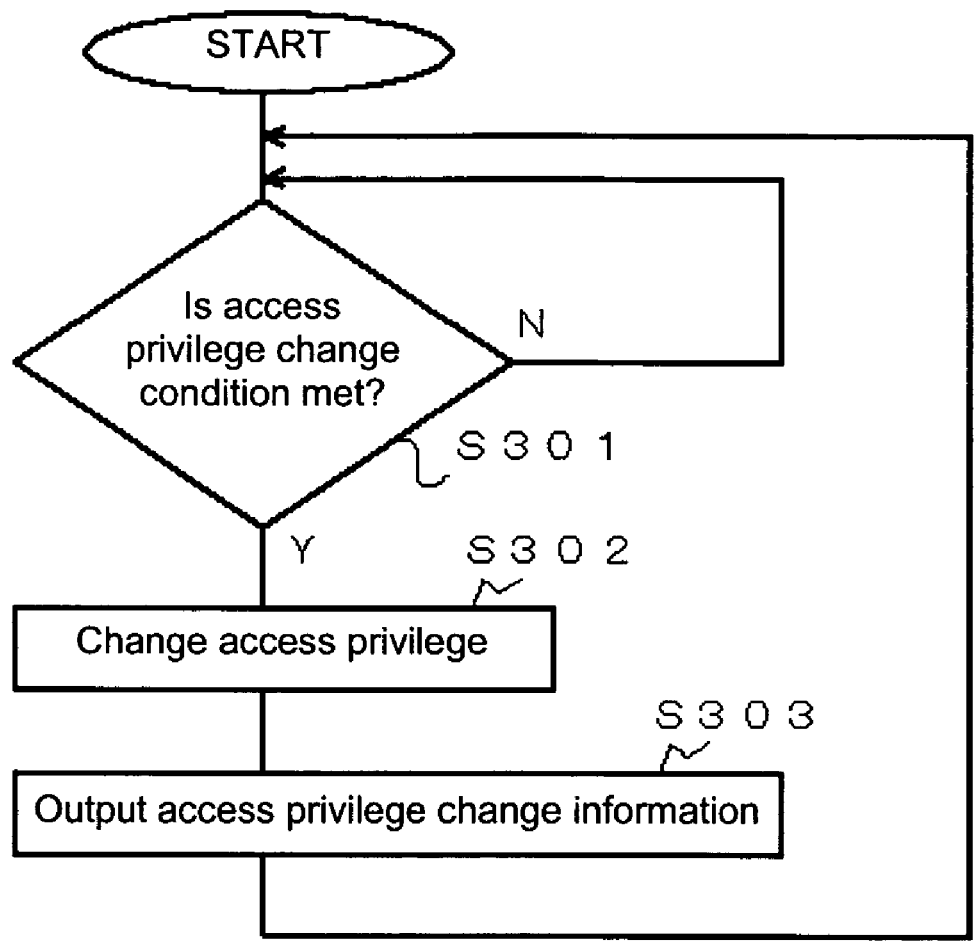
FIG. 31 is a flow chart showing a process when the ninth embodiment of the user information management apparatus according to the present invention comprises access privilege change information output means.

FIG. 31 is a flow chart showing processing of the user information management apparatus when the user information management apparatus comprises the access privilege change information output means 301.

At the step S301, one waits until a condition for changing access privilege has been met. When the condition for changing access privilege is met, processing goes to the step S302 at which access privilege is changed. Then, at the step S303, access privilege change information is outputted.

Figure 32:
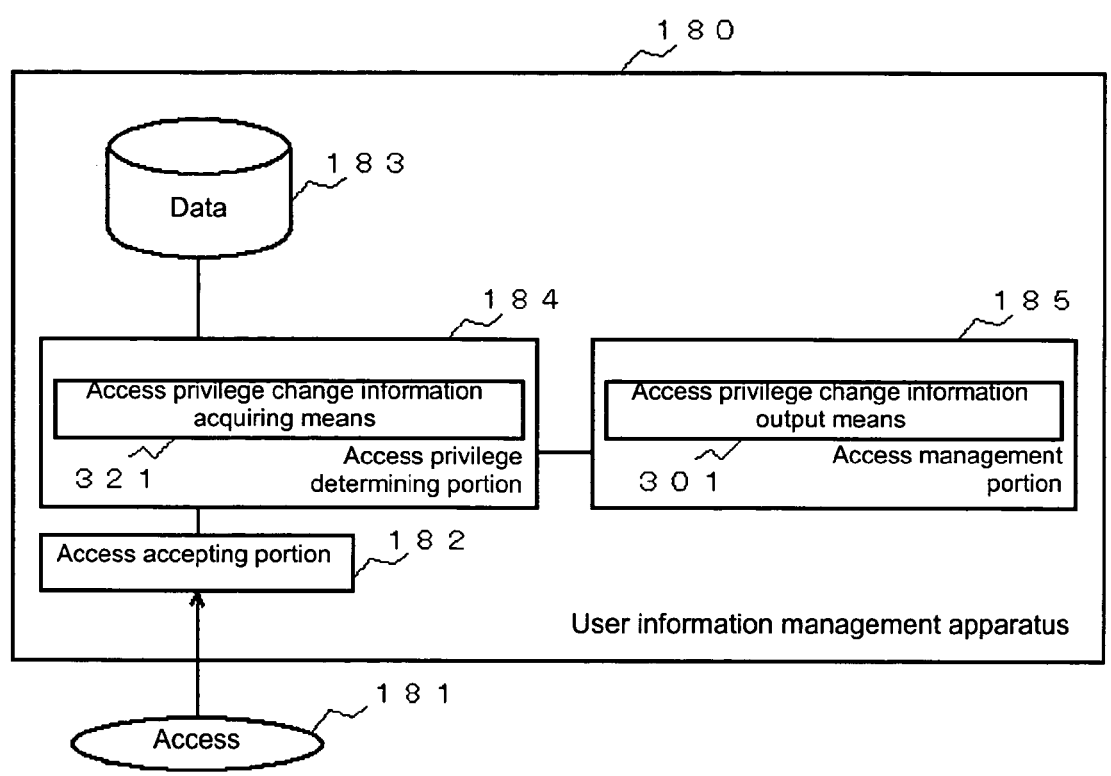
FIG. 32 is a schematic block diagram depicting a case in which the ninth embodiment of the user information management apparatus according to the present invention comprises access privilege change information acquiring means.

An output destination for the access privilege change information output means 301 to output access privilege change information includes access privilege change information acquiring means that the access privilege determining section 184 has. That is, the access privilege change information acquiring means is included in the access privilege determining section 184, as shown in FIG. 32, and receives the access privilege change information outputted by the access privilege change information output means 301.

Figure 33:
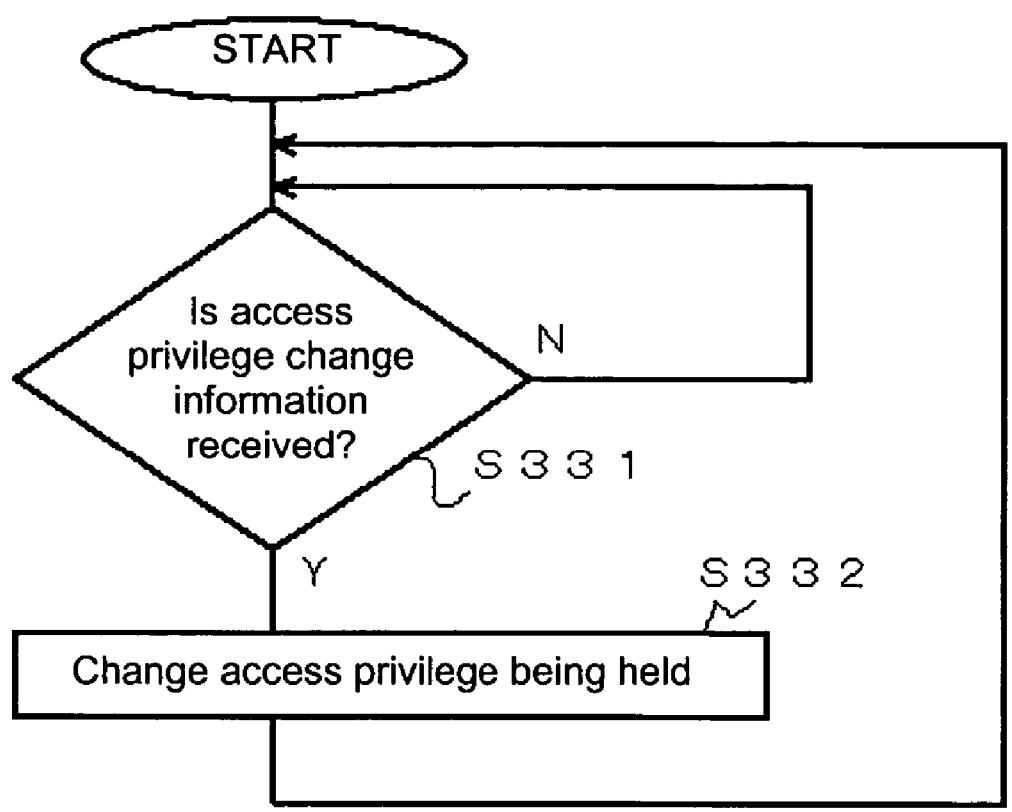
FIG. 33 is a flow chart showing a processing when the ninth embodiment of the user information management apparatus according to the present invention comprises access privilege change information acquiring means.

FIG. 33 is a flow chart illustrating an operation of the access privilege change information acquiring means. At the step S331, one waits until access privilege change information has been received. After the access privilege change information has been received, processing goes to the step S332 at which the maintained access privilege is changed. In this case, the access privilege is assumed to be held at an access privilege determining section 184 as well as the access management section 185. What is changed at the step S332 is access privilege held at the access privilege determining section 184.

The access privilege determining section 184 thus comprises the access privilege change information acquiring means 321, whereby the access privilege determining section can store the access privilege. This makes it possible to make a change in synchronism with the access privilege stored in the access management section 185, and makes it unnecessary to acquire the access privilege from the access management section when the access privilege determining section determines whether or not data access privilege exists.

Figure 34:
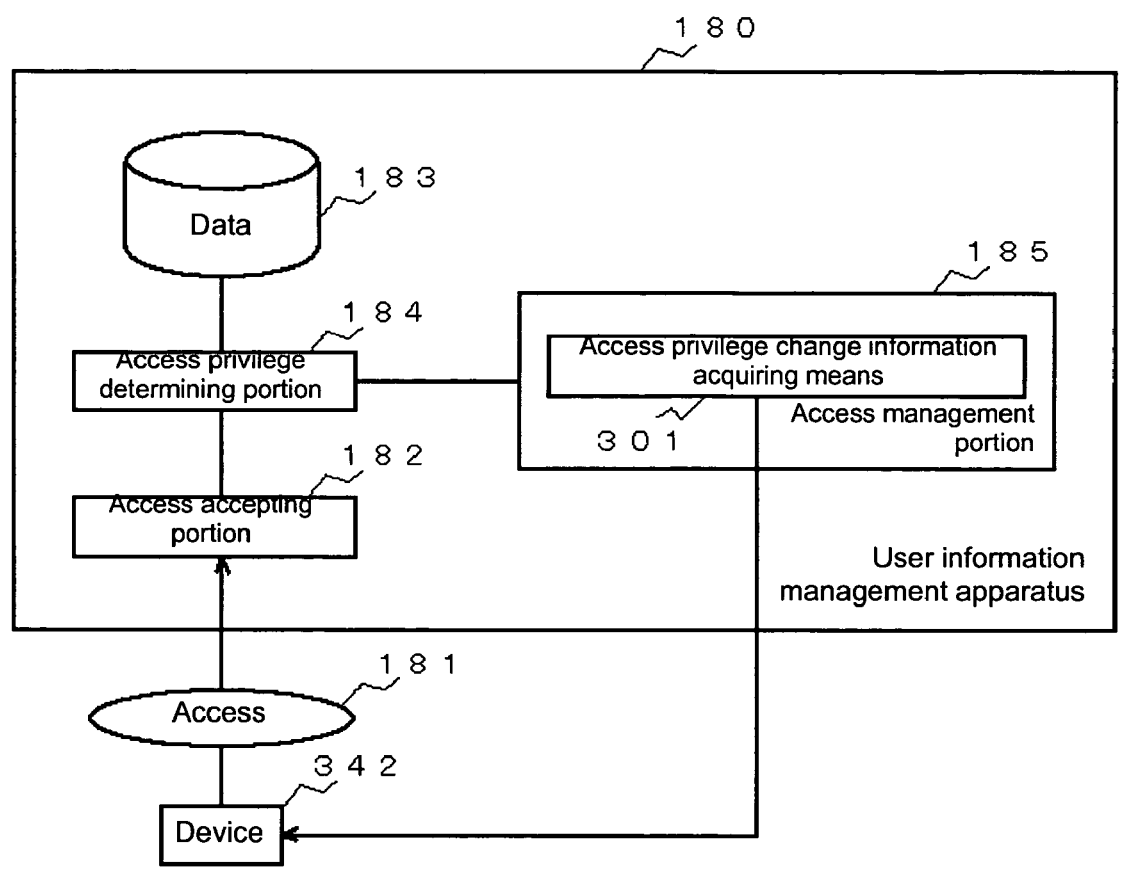
FIG. 34 is a schematic block diagram depicting a case in which the ninth embodiment of the user information management apparatus according to the present invention comprises access privilege change information output means, to output information indicative of the changed access privilege to a device.

In addition, as shown in FIG. 34, when the access accepting section 182 accepts access 181 from device 342, the access privilege change information output means 301 may output access privilege change information to the device 342.

By doing this, the device 342 can store the current access privilege, and the content can be identical to the access privilege stored in the access management section 185. Thus, the device 342 can determine the access privilege before transmitting the access 181 to the access accepting section 182, and can prevent wasteful transmission of the access 181. In particular, when the access management section 185 changes the access privilege to its lower privilege after high access privilege has been acquired, the device 342 can automatically change the stored access privilege to its lower privilege by using the access privilege change information. This makes it possible to prevent the device 342 from providing access to data requiring high access privilege after the device has determined that high access privilege exists or to prevent processing from being interrupted if an error such as absence of access privilege occurs.

Figure 35:
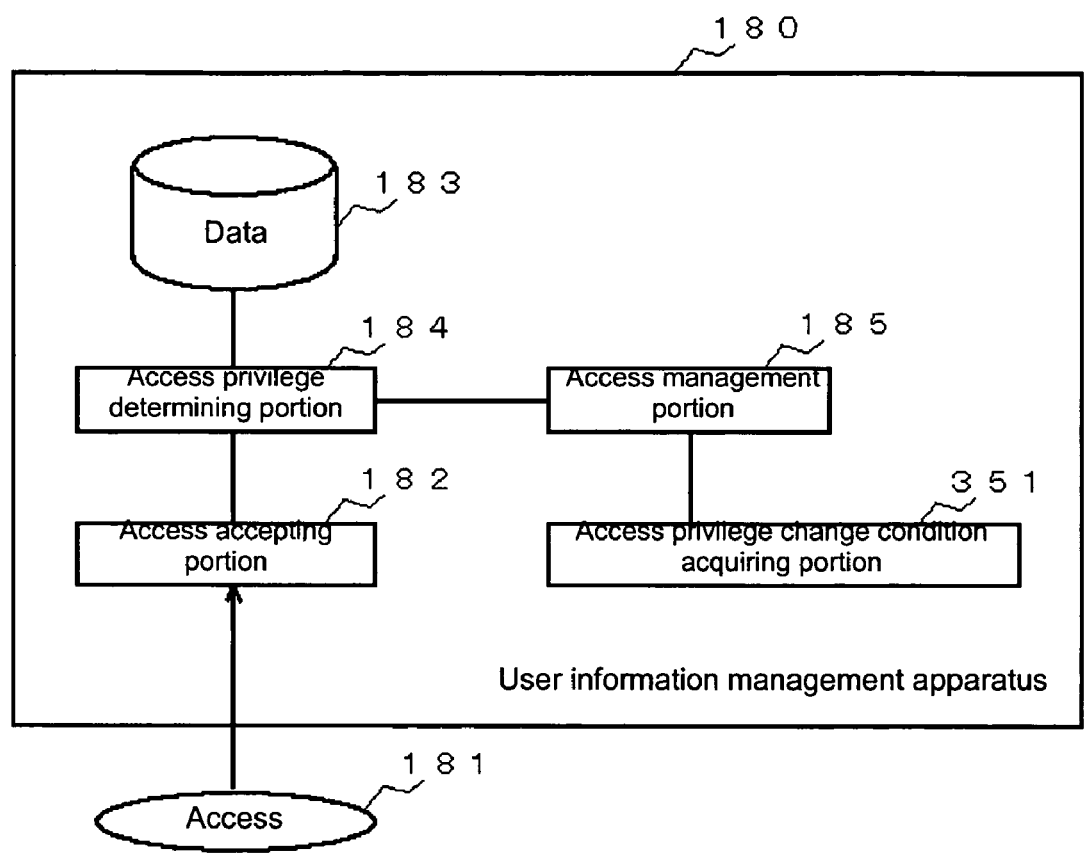
FIG. 35 is a schematic block diagram depicting a case in which the ninth embodiment of the user information management apparatus according to the present invention comprises an access privilege change condition acquiring section.

In addition, in order for the access management section 185 to acquire a condition for changing access privilege, the user information management apparatus 180 may comprise an access privilege change condition acquiring section 351, as shown in FIG. 35. The access privilege change condition acquiring section 351 acquires a condition for changing access privilege. The condition is any one of a no access time; data access count; an instruction from an accessing person; an instruction from an operating system; an instruction from an application program; an elapsed time after starting access; time information; access rejection count; and an elapsed time after changing access privilege or a combination of two or more thereof. The no access time denotes an elapsed time after access has been made. When access is accepted next, the measurement of the elapsed time is restarted from 0. The data access count denotes the access acceptance count, or alternatively, specific data access count. The instruction from an accessing person denotes an instruction for changing access privilege by a person who transmits access to the user information management apparatus 180. The instruction from an operating system denotes an instruction for changing access privilege from an operating system of a computer that achieve the user information management apparatus 180 or a computer to which the user information management apparatus 180 is connected. An example includes changing access privilege in order for a computer to stop. The instruction from an application program denotes an instruction from an application program that operates on a computer that embodies the user information management apparatus 180 or a computer to which the user information management apparatus 180 is connected. For example, an instruction for changing access privilege at the end of an application program is exemplified. The elapsed time after starting access denotes an elapsed time after the access 181 has been first accepted at the access accepting section 182. Unlike the no access time, even if access is accepted next, measurement of the elapsed time is not started from zero. Time information denotes information representing that the current time reaches a specific time. The access rejection count denotes the count when the access privilege determining section determines that no access privilege exists. For example, if it is determined that no access privilege exists three times, it can be changed to another access privilege. The elapsed time after changing access privilege denotes an elapsed time after data access privilege to the access data has been changed. After access privilege change has been made, a predetermined period of time has elapsed, for example, lower access privilege or no access privilege is set, whereby these settings are established even after a user having access accepted had left there. This makes it possible to prevent another person from accessing data.

In addition, by combining two or more of the above listed conditions including: the no access time; data access count; instruction from an accessing person; instruction from the operating system; instruction from an application program; elapsed time after starting access; time information, access rejection count, and elapsed time after changing access privilege, data can be further prevented from being accessed by another person. For example, assuming that the no access time is set to 1 hour 30 minutes; the elapsed time after starting access is set to 2 hours 30 minutes; and the elapsed time after changing access privilege is set to 3 hours, and assuming that all access privilege will be deprived of if a condition in which these times are elapsed is met, a first access is made at 8:00 a.m., and the access privilege is changed to a higher one. Then, a second access is made at 9:00 a.m., and a third access is made at 10:00 a.m. If the time reaches 11:00 a.m. after the user has left here, the conditions for the no access time and elapsed time after starting access are not met. However, the condition for the elapsed time after changing access privilege is met. Thus, all access privilege will be deprived of, and nobody can make access. Thus, two or more of the above condition elements are combined, thereby improving safety.

After data access has been accepted, even if an error occurs due to the absence of access privilege, the access privilege for data on the accepted access is changed, and operation can be continued as is. Thus, the user may not repeat the same operation to be made by changing the access privilege again.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A user information management apparatus constructed at at least one of (a) a server capable of making bidirectional communication with a user terminal, and (b) a user terminal, the apparatus comprising:

storage means for holding user information concerning a plurality of users who use the user terminal to be associated with a security level;

identification means for, when a user makes access to the server and an attempt is made by the user to use a predetermined application, identifying the user;

level determination means for, when the user makes access to the server, determining at which of a plurality of predetermined certification levels this access is;

transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information at security levels other than the lowest thus enabled to be transmitted.

2. A user information management apparatus according to claim 1, wherein said transmission disabling means enables only user information at a security level lower than the security level that corresponds to the determined level to be transmitted to the user terminal and/or another device.

3. A user information management apparatus according to claim 1 or claim 2, wherein said user identifying means uses at least one of (a) a password inputted by the user at the user terminal, (b) ID card information, (c) magnetic card information, (d) fingerprint, (e) voiceprint, and (f) iris print of the user which are read by the user terminal.

4. A user information management apparatus according to claim 1 or claim 2, wherein said level determining means determines a predetermined technique employed by the user for the purpose of user identification, thereby determining a level.

5. A user information management apparatus constructed at at least one of (a) a server capable of making bidirectional communication with a user terminal, and (b) a user terminal, the apparatus comprising: storage means for holding user information concerning a plurality of users who use the user terminal to be associated with a security level; identification means for, when a user makes access to the server and an attempt is made by the user to use a predetermined application, identifying the user; level determination means for, when the user makes access to the server, determining at which of a plurality of predetermined certification levels this access is; transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information thus enabled to be transmitted, wherein said user identifying means determines said user based on a predetermined instruction from an input device operated by said user at said user terminal, and said level determining means determines that the certification level is the lowest.

6. A user information management apparatus constructed at at least one of (a) a server capable of making bidirectional communication with a user terminal, and (b) a user terminal, the apparatus comprising: storage means for holding user information concerning a plurality of users who use the user terminal to be associated with a security level; identification means for, when a user makes access to the server and an attempt is made by the user to use a predetermined application, identifying the user; level determination means for, when the user makes access to the server, determining at which of a plurality of predetermined certification levels this access is; transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information thus enabled to be transmitted, wherein, if a current certification level of the user is lower than a desired certification level required for data acquisition, said transmission control means instructs the user to take action required to level up to the required certification level.

7. A user information management apparatus constructed at at least one of (a) a server capable of making bidirectional communication with a user terminal, and (b) a user terminal, the apparatus comprising: storage means for holding user information concerning a plurality of users who use the user terminal to be associated with a security level; identification means for, when a user makes access to the server and an attempt is made by the user to use a predetermined application, identifying the user; level determination means for, when the user makes access to the server, determining at which of a plurality of predetermined certification levels this access is; transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information thus enabled to be transmitted, wherein said transmission control means has means for defining a security level specific to said user information and means for managing said user information for said each security level.

8. A user information management apparatus according to any one of claims 5 to 7, wherein the apparatus is arranged to hold, in the storage means, information common to a plurality of users who use the user terminals as group data to be associated with a security level.

9. A user information management apparatus constructed at at least one of (a) a server capable of making bidirectional communication with a user terminal, and (b) a user terminal, the apparatus comprising: storage means for holding user information concerning a plurality of users who use the user terminal to be associated with a security level; identification means for, when a user makes access to the server and an attempt is made by the user to use a predetermined application, identifying the user; level determination means for, when the user makes access to the server, determining at which of a plurality of predetermined certification levels this access is; transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information thus enabled to be transmitted, wherein, for a set of requested data, an index as an ID is obtained from a distance between a probability of such an event and data, and then, the obtained value is used to reconfirm a security.

10. A user information management apparatus constructed at at least one of (a) a server capable of making bidirectional communication with a user terminal, and (b) a user terminal, the apparatus comprising: storage means for holding user information concerning a plurality of users who use the user terminal to be associated with a security level; identification means for, when a user makes access to the server and an attempt is made by the user to use a predetermined application, identifying the user; level determination means for, when the user makes access to the server, determining at which of a plurality of predetermined certification levels this access is; transmission control means for enabling transmission of only the user information at the security level and the lower security level than said security level that corresponds to the determined level to the user terminal and/or another device among the user information held in the storage means; and transmission disabling means for, following at least one of conditions (a) an elapse of a predetermined period of time and/or an execution of a predetermined operation after predetermined user information is enabled to be transmitted by transmission control means, and (b) an input a predetermined instruction from the user, disabling transmission of user information thus enabled to be transmitted, wherein the apparatus is arranged so that said plurality of user terminals are classified in advance into a plurality of security divisions, and security division determining means is provided, thereby applying access restriction for such each security division of the user terminal that has made access.

11. A user information management apparatus according to claim 10, wherein the apparatus is arranged to determine the security division of the user terminal based on the registered number of users of the user terminal.

12. A user information management apparatus according to claim 10, wherein the apparatus is arranged so that, when the security division falls into a predetermined division among said security divisions, and a certification level is lowered, data transmitted from the server to the user terminal is deleted before the certification level is changed to be lowered.

13. A user information management apparatus according to claim 10, wherein the apparatus is arranged so that, when the security division falls into a predetermined division among said security divisions, data inputted from the user terminal is automatically and/or periodically transmitted to a predetermined work area of the server.

14. A user information management apparatus according to any one of claims 5 to 7, wherein said transmission control means further comprises a user information use criterion storing means for storing a user information use criterion for a data requester in advance and a user information providing condition storing means for storing a user information providing condition for a data provider in advance, and, when the user information use criterion and the user information providing condition are compared with each other, and transmission is controlled based on the comparison result, if user information other than that on a user determined by the user determination means is contained in data, the user information providing condition of the user is obtained, and comparison with the user information use criterion is carried out, thereby determining whether or not transmission is carried out.

15. A user information management method in the user information management apparatus constructed at at least one of (a) a server capable of making bidirectional communication with a user terminal and (b) the user terminal, the method comprising the steps of:
storage step of holding user information concerning a plurality of users who use the user terminal to be associated with a security level; identification step of, when a user makes access to the server and an attempt is made by the user to use a predetermined application, identifying the user;
level determining step of, when the user makes access to the server, determining at which of a plurality of predetermined certification levels this access is;
transmission control step of enabling transmission of only the user information at the security level and the lower security level than said security level that corresponds to the determined level to the user terminal and/or another device among the user information held in the storage step; and
transmission disabling step of, following at least one of conditions (a)an elapse of a predetermined period of time and/or an execution of a predetermined operation after predetermined user information is enabled to be transmitted by transmission control step, and (b) an input of a predetermined instruction from the user, disabling transmission of user information at security levels other than the lowest thus enabled to be transmitted.

16. A user information management method according to claim 15, wherein said transmission disabling step enables only user information at a security level lower than the security level that corresponds to the determined level to be transmitted to the user terminal and/or another device.

17. A user information management method according to claim 15 or claim 16, wherein said user identifying step uses at least one of (a) a password inputted by the user at the user terminal, (b) ID card information, (c) magnetic card information, (d) fingerprint, (d) voiceprint, and (e) iris print of the user which are read by the user terminal.

18. A user information management method according to claim 15 or claim 16, wherein said level determining step determines a predetermined technique employed by the user for the purpose of user identification, thereby determining a level.

19. A user information management method in the user information management apparatus constructed at at least one of (a) a server capable of making bidirectional communication with a user terminal and (b) the user terminal, the method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, following at least one of conditions (a) an elapse of a predetermined period of time and/or an execution of a predetermined operation after predetermined user information is enabled to be transmitted by transmission control step, and (b) an input of a predetermined instruction from the user, disabling transmission of user information thus enabled to be transmitted, wherein said user identifying step determines said user based on a predetermined instruction from an input device operated by said user at said user terminal, and, in this case, said level determining step determines that the certification level is the lowest.

20. A user information management method in the user information management apparatus constructed at at least one of (a) a server capable of making bidirectional communication with a user terminal and (b) the user terminal, the method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, following at least one of conditions (a) an elapse of a predetermined period of time and/or an execution of a predetermined operation after predetermined user information is enabled to be transmitted by transmission control step, and (b) an input of a predetermined instruction from the user, disabling transmission of user information thus enabled to be transmitted, wherein, if a current certification level of the user is lower than a desired certification level required for data acquisition, said transmission control step instructs the user to take action required to level up to the required certification level.

21. A user information management method in the user information management apparatus constructed at at least one of (a) a server capable of making bidirectional communication with a user terminal and (b) the user terminal, the method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, following at least one of conditions (a) an elapse of a predetermined period of time and/or an execution of a predetermined operation after predetermined user information is enabled to be transmitted by transmission control step, and (b) an input of a predetermined instruction from the user, disabling transmission of user information thus enabled to be transmitted, wherein said transmission control step has the step of defining a security level specific to said user information and the step of managing said user information for said each security level.

22. A user information management method according to any one of claims 19 to 21, wherein the method is arranged to hold, in the storage step, information common to a plurality of users who use the user terminals as group data to be associated with a security level.

23. A user information management method in the user information management apparatus constructed at at least one of (a) a server capable of making bidirectional communication with a user terminal and (b) the user terminal, the method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, following at least one of conditions (a) an elapse of a predetermined period of time and/or an execution of a predetermined operation after predetermined user information is enabled to be transmitted by transmission control step, and (b) an input of a predetermined instruction from the user, disabling transmission of user information thus enabled to be transmitted, wherein the method comprises the step of obtaining, for a set of requested data, an index as an ID from a distance between a probability of such an event and data, and then using the obtained value to reconfirm a security.

24. A user information management method in the user information management apparatus constructed at at least one of (a) a server capable of making bidirectional communication with a user terminal and (b) the user terminal, the method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, following at least one of conditions (a) an elapse of a predetermined period of time and/or an execution of a predetermined operation after predetermined user information is enabled to be transmitted by transmission control step, and (b) an input of a predetermined instruction from the user, disabling transmission of user information thus enabled to be transmitted, wherein the method is arranged so that said plurality of user terminals are classified in advance into a plurality of security divisions, and security division determining step is provided, thereby applying access restriction for such each security division of the user terminal that has made access.

25. A user information management method according to claim 24, wherein the method is arranged to determine the security division of the user terminal based on the registered number of users of the user terminal.

26. A user information management method according to claim 24, wherein the method is arranged so that, when the security division falls into a predetermined division among said security divisions, and a certification level is lowered, data transmitted from the server to the user terminal is deleted before the certification level is changed to be lowered.

27. A user information management method according to claim 24, wherein the method is arranged so that, when the security division falls into a predetermined division among said security divisions, data inputted from the user terminal is automatically and/or periodically transmitted to a predetermined work area of the server.

28. A user information management method according to any one of claims 23 to 27, wherein, a user information use criterion for a data requester is stored in advance, and a user information providing condition for a data provider is stored in advance, and when the transmission control step further compares the user information use criterion and the user information providing condition with each other, so that transmission is controlled based on the comparison result, if user information other than that on a user determined by the user determination means is contained in data, the user information providing condition of the user is obtained, and comparison with the user information use criterion is carried out, thereby determining whether or not transmission is carried out.

29. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of:
storage step of holding user information concerning a plurality of users who use the user terminal to be associated with a security level;
identification step of, when a user makes access to the server and an attempt is made by the user to use a predetermined application, identifying the user;
level determining step of, when the user makes access to the server, determining at which of a plurality of predetermined certification levels this access is;
transmission control step of enabling transmission of only the user information at the security level and the lower security level than said security level that corresponds to the determined level to the user terminal and/or another device among the user information held in the storage step; and
transmission disabling step of, after elapse of a predetermined period of time and/or after execution of a predetermined operation after predetermined user information is enabled to be transmitted by transmission control step, or alternatively, according to a predetermined instruction from the user, disabling transmission of user information at security levels other than the lowest thus enabled to be transmitted.

30. A recording medium having recorded therein in a computer readable state a control program for executing the user information management method according to claim 29, wherein said transmission disabling step enables transmission of only user information at a security level lower than said security level corresponding to said determined level to said user terminal and/or another device.

31. A recording medium having recorded in a computer readable state a control program for executing the user information management method according to claim 29 or claim 30, wherein said user identifying step uses at least one of (a) a password inputted by the user at the user terminal, (b) any one or more of ID card information, (c) magnetic card information, (d) fingerprint, (e) voiceprint, and (f) iris print of the user.

32. A recording medium having recorded in a computer readable state a control program for executing the user information management method according to claim 29 or claim 30, wherein said level determining step determines a predetermined technique employed by the user for the purpose of user identification, thereby determining a level.

33. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted, wherein said user identifying step determines said user based on a predetermined instruction from an input device operated by said user at said user terminal, and, in this case, said level determining step determines that the certification level is the lowest.

34. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted, wherein, if a current certification level of the user is lower than a desired certification level required for data acquisition, said transmission control step instructs the user to take action required to level up to the required certification level.

35. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted, wherein said transmission control step has the step of defining a security level specific to said user information and the step of managing said user information for said each security level.

36. A recording medium having recorded in a computer readable state a control program for executing the user information managing method according to any one of claims 33 to 35, wherein the recording medium is arranged to hold, in the storage step, information common to a plurality of users who use the user terminals as group data to be associated with a security level.

37. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted, wherein the recording medium is arranged so that, for a set of requested data, an index as an ID is obtained from a distance between a probability of such an event and data, and then, the obtained value is used to reconfirm a security.

38. A recording medium having recorded therein in a computer readable state a control program for executing the user information management method in the user information management apparatus constructed at at least one of (a) a server capable of making bidirectional communication with a user, and (b) the user terminal, the recording medium having recorded therein in a computer readable state a control program for executing the user information management method comprising the steps of: storage step of holding user information concerning a plurality of users who use the user terminal to be associated with a security level; identification step of, when a user makes access to the server and an attempt is made by the user to use a predetermined application, identifying the user; level determining step of, when the user makes access to the server, determining at which of a plurality of predetermined certification levels this access is; transmission control step of enabling transmission of only the user information at the security level and the lower security level than said security level that corresponds to the determined level to the user terminal and/or another device among the user information held in the storage step; and transmission disabling step of, after elapse of a predetermined period of time and/or after execution of a predetermined operation after predetermined user information is enabled to be transmitted by transmission control step, or alternatively, according to a predetermined instruction from the user, disabling transmission of user information thus enabled to be transmitted, wherein the recording medium is arranged so that said plurality of user terminals are classified in advance into a plurality of security divisions, and security division determining step is provided, thereby applying access restriction for such each security division of the user terminal that has made access.

39. A recording medium having recorded in a computer readable state a control program for executing the user information managing method according to claim 38, wherein the recording medium is arranged to determine the security division of the user terminal based on the registered number of users of the user terminal.

40. A recording medium having recorded in a computer readable state a control program for executing the user information managing method according to claim 38, wherein the recording medium is arranged so that, when the security division falls into a predetermined division among said security divisions, and a certification level is changed to be lowered, data transmitted from the server to the user terminal is deleted before the certification level is lowered.

41. A recording medium having recorded in a computer readable state a control program for executing the user information managing method according to claim 38, wherein, when the security division falls into a predetermined division among said security divisions, data inputted from the user terminal is automatically and/or periodically transmitted to a predetermined work area of the server.

42. A recording medium having recorded in a computer readable state a control program for executing the user information managing method according to any one of claims 37 to 41, wherein the recording medium is arranged so that, a user information use criterion for a data requester is stored in advance, and a user information providing condition for a data provider is stored in advance, and when the user information use criterion and the user information providing condition are compared with each other, and transmission is controlled based on the comparison result, if user information other than that on a user determined by the user determination means is contained in data, the user information providing condition of the user is obtained, and comparison with the user information use criterion is carried out, thereby determining whether or not transmission is carried out.

43. A user information management apparatus comprising:
   an access accepting section for accepting data access;
   an access privilege determining section for determining the presence or absence of access privilege relevant to data on the access accepted at the access accepting section; and
   an access management section for making a change in access privilege relevant to data on the access accepted at the access accepting section.

44. A user information management apparatus according to claim 43, wherein the access privilege determining section determines the presence or absence of access privilege based on an access privilege table in which data and access privilege are associated with each other.

45. A user information management apparatus according to claim 43, wherein the access privilege determining section determines the presence or absence of access privilege based on the access privilege described in data.

46. A user information management apparatus according to claim 43, wherein the access management section has an access privilege change information output means for outputting access privilege change information indicative of the changed access privilege.

47. A user information management apparatus according to claim 46, wherein the access privilege determining section has access privilege change information acquiring means for acquiring access privilege change information from the access privilege change information output means.

48. A user information management apparatus according to claim 46, wherein the access accepting section accepts an access from a device, and the access privilege change information output means transmits the access privilege change information to said device.

49. A user information management apparatus according to claim 43, further comprising an access privilege change condition acquiring section for acquiring a condition for changing access privilege.

50. A user information management apparatus according to any one of claims 43 to 47, wherein a change in access privilege at the access management section is a change in access level privilege within the range of data that can be accessed.

51. A user information management apparatus according to any one of claims 43 to 47, wherein the data to be accessed is classified by the owners, and a change in access privilege is a change in access privilege to data of another owner associated with the accessed data.

52. A user information management apparatus according to claim 51, wherein the access management section is restored to the original access privilege after the completion of processing by said access change.

53. A user information management apparatus according to any one of claims 43 to 47, wherein, when it is determined that an access at the access accepting section is provided without privilege at the access privilege determining section, there is further provided an certification acquiring section that requests acquisition of access privilege.

54. A user information management apparatus according to claim 49, wherein a condition for changing said access privilege is at least one of: (a) a no access continuation time, (b) data access count, (c) an instruction from an accessing person, (d) an instruction from an operating system, (e) an instruction from an application program, (f) an elapsed time after starting access, (g) time information, (h) access rejection count, (i) an elapsed time after changing access privilege, and (j) a combination of two or more thereof.

55. A user information management program causing a computer to execute the steps of:
   access accepting step of accepting data access;
   access privilege determining step of determining the presence or absence of access privilege to the access data accepted in the access accepting step; and
   access management step of changing the access privilege relevant to data on the access accepted in the access accepting step.

56. A user information management program according to claim 55, the program causing a computer to execute the access privilege change information output step of outputting access privilege change information that is information indicative of the changed access privilege in the access management step.

57. A user information management program according to claim 55, the program causing a computer to execute the access privilege change condition acquiring step of acquiring a condition for changing access privilege.

\* \* \* \* \*